(12) United States Patent
Messner et al.

(10) Patent No.: US 7,948,708 B2
(45) Date of Patent: May 24, 2011

(54) SIMULTANEOUS BIT PATTERN DETERMINATION AND HEAD POSITIONAL INFORMATION DETECTION ON PATTERNED MEDIA

(75) Inventors: William C. Messner, Pittsburgh, PA (US); Hiroyuki Suzuki, Sagamlhara (JP); James A. Bain, Pittsburgh, PA (US); Vijayakumar Bhagavatula, Pittsburgh, PA (US); Sheida Nabavi, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 32 days.

(21) Appl. No.: 12/408,954

(22) Filed: Mar. 23, 2009

(65) Prior Publication Data

US 2010/0238584 A1   Sep. 23, 2010

(51) Int. Cl.
G11B 5/596 (2006.01)
G11B 21/02 (2006.01)
(52) U.S. Cl. ...................................... 360/77.08; 360/75
(58) Field of Classification Search .................. None
See application file for complete search history.

(56) References Cited

U.S. PATENT DOCUMENTS

| | | | |
|---|---|---|---|
| 6,480,323 B1 | 11/2002 | Messner et al. | |
| 6,738,207 B1 * | 5/2004 | Belser et al. | 360/31 |
| 6,754,016 B2 | 6/2004 | Messner et al. | |
| 6,754,017 B2 * | 6/2004 | Rettner et al. | 360/51 |
| 6,947,235 B2 * | 9/2005 | Albrecht et al. | 360/55 |
| 7,307,808 B2 * | 12/2007 | Kaizu et al. | 360/75 |
| 7,324,294 B2 | 1/2008 | Moser | |
| 7,408,733 B2 | 8/2008 | Satoh et al. | |
| 7,443,626 B2 * | 10/2008 | Asakura et al. | 360/64 |
| 7,474,485 B2 | 1/2009 | Kisaka et al. | |
| 7,612,961 B2 * | 11/2009 | Yamamoto | 360/48 |
| 7,729,073 B2 * | 6/2010 | Yamamoto | 360/48 |
| 2009/0061259 A1 | 3/2009 | Lee et al. | |

OTHER PUBLICATIONS

Karakulak et al., "A New Read Channel Model for Patterned Media Storage", IEEE Transactions on Magnetics, vol. 44, No. 1, Jan. 2008, pp. 193-197.
Karakulak et al., "A New Read Head Model for Patterned Media Storage", TMRC, E3 (2007), 2 pages.
Suzuki et al., "Simultaneous PES Generation, Timing Recovery, and Multi Track Read on Patterned Media", 1 page.
Suzuki et al., "Simultaneous PES Generation, Timing Recovery, and Multi Track Read on Patterned Media," Apr. 2009, 4 pages with abstract.
Suzuki et al., "A Method for Simultaneous Position and Timing Error Detection for Bit-Patterned Media", IEEE Transactions on Magnetics, vol. 45, No. 10, Oct. 2009, pp. 3749 3752.
Suzuki et al., "Simultaneous PES Generation, Timing Recovery, and Multi Track Read on Patterned Media: Concept and Performance," IEEE Transactions on Magnetics, vol. 46, No. 3, Mar. 2010, pp. 825-829.

(Continued)

Primary Examiner — K. Wong
(74) Attorney, Agent, or Firm — K&L Gates LLP

(57) ABSTRACT

An apparatus, system, and method comprise a magnetoresistive head configured to respond to magnetization states of patterned cells formed on a patterned medium. The magnetoresistive head detects the magnetization states of at least two patterned cells formed on a patterned medium. The magnetoresistive head generates a readback signal based on the magnetization state of the at least two patterned cells. A detector circuit coupled to the head determines a bit pattern corresponding to the readback signal. A processor circuit coupled to the detector circuit determines positional information associated with the magnetoresistive head relative to the at least two patterned cells based on the bit pattern. The system further comprises a patterned medium.

30 Claims, 16 Drawing Sheets

OTHER PUBLICATIONS

Richter et al., "Recording on Bit-Patterned Media at Densities of 1 Tb/in2 and Beyond," Magnetics Conference, 2006, INTERMAG 2006, IEEE International, May 2006, Current Version Jun. 25, 2007, 2 pages with abstract.

Wilton et al., "Approximate Three-Dimensional Head Fields for Perpendicular Magnetic Recording," IEEE Transactions on Magnetics, vol. 40, No. 1, Jan. 2004, pp. 148-156.

Ioannou et al., "Position Error Signal Estimation at High Sampling Rates Using Data and Servo Sector Measurements," Decision and Control, 2002, Proceedings of the 41$^{st}$ IEEE Conference on Dec. 10-13, 2002, pp. 67-72, accompanied by abstract.

Ioannou et al., "Identification and High Bandwidth Control of Hard Disk Drive Servo Systems Based on Sampled Data Measurements," IEEE Transactions Control System Technology, vol. 15, No. 6, Nov. 2007, pp. 1089-1095.

Yuan et al., "Cross-Track Characteristics of Shielded MR Heads," IEEE Transactions on Magnetics, vol. 30, No. 2, Mar. 1994, pp. 381-387.

Wiesen et al., "GMR Head Side-Reading and Bit Aspect Ratio," IEEE Transactions on Magnetics, vol. 39, No. 5, Sep. 2003, pp. 2609-2611.

* cited by examiner

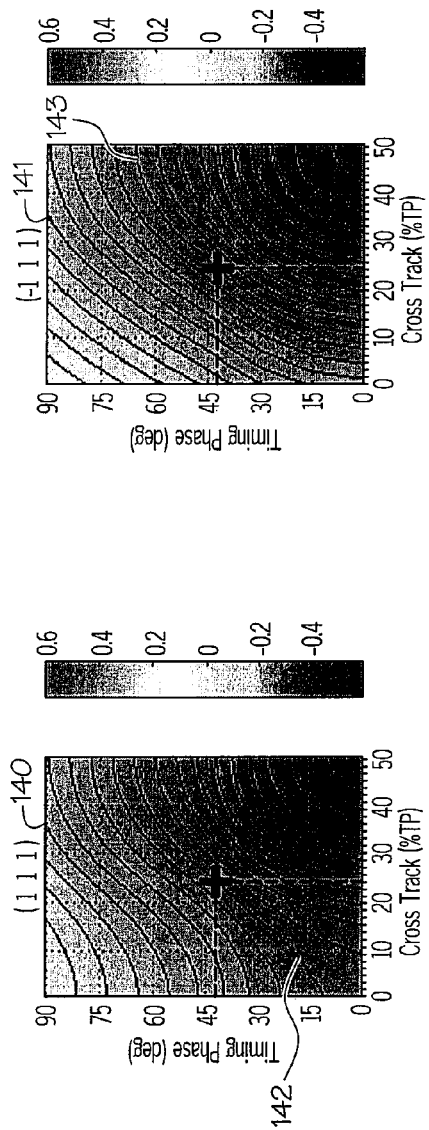
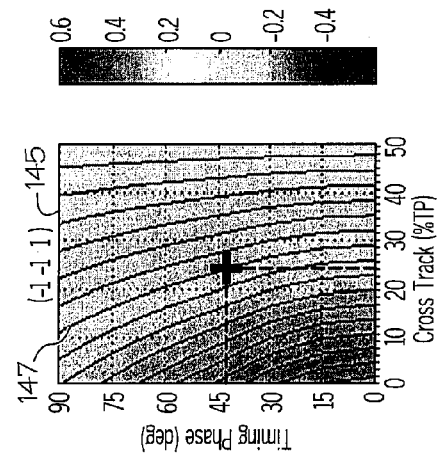
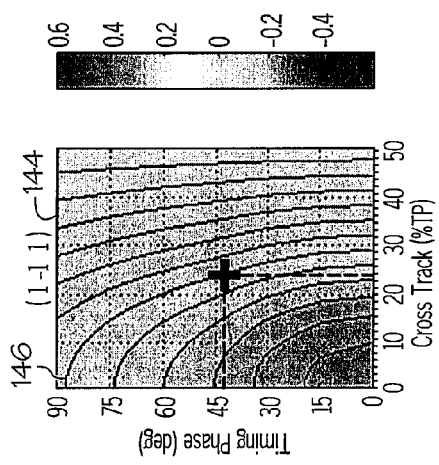
FIG. 15A  FIG. 15B  FIG. 15C  FIG. 15D

SIMULTANEOUS BIT PATTERN DETERMINATION AND HEAD POSITIONAL INFORMATION DETECTION ON PATTERNED MEDIA

BACKGROUND

Conventional continuous magnetic storage technology employs a magnetic medium formed on a disk to store information as "bits" across a few hundred magnetic grains formed on a magnetic recording layer of the medium, i.e., the magnetic medium. The bits are recorded by directionally magnetizing ferromagnetic material to represent a binary digit as either a logical 0 or a logical 1. Information is written to, recorded, on the magnetic medium as it rotates past a device called a read-and-write head (abbreviated as the "head" herein). The head operates very close (e.g., tens of nanometers) over the magnetic surface of the medium. The head is used to detect (read) and modify (write) the magnetization of the material of the magnetic medium immediately under it.

It is generally accepted that increases in areal density in conventional magnetic media are achieved primarily by scaling the diameters and the number of magnetic grains per recorded bit, which must be large to maintain an acceptable signal-to-noise ratio (SNR). As magnetic grain sizes are reduced, thermal fluctuations can spontaneously reverse the grain magnetization direction. This limits the areal storage density that can be practically achieved using conventional magnetic storage technology.

Patterned media is a new magnetic storage technology being considered by the disk drive industry to increase the areal storage density of a magnetic medium beyond the one terabit (1e12 bits) per square inch. In patterned media, information is stored in a uniform array of patterned cells, storing one "bit" per cell, rather than storing information across a few hundred magnetic grains allowing for greater areal density than normally possible with conventional magnetic storage technology. The patterned cells are formed of magnetic material on the magnetic medium portion of a storage disk. The magnetic bits are recorded on predefined, single domain patterned cells or islands of magnetization that can be magnetized and demagnetized using the head in much the same way as is currently done in conventional magnetic storage technology. Distinct bit patterns may be created by magnetizing and demagnetizing the patterned cells.

The patterned cells may be formed on the magnetic medium using manufacturing processes different from conventional continuous magnetic media. A magnetic medium with patterned cells formed thereon may be referred to as a patterned medium or bit patterned medium. The patterned cells may be formed on the magnetic media at the time of manufacture. At such time, distinct bit patterns may be formed when the media is formatted to indicate read-head position and track number, otherwise known as servo information. There are presently a variety of methods for generating the patterned cells in patterned media, although it is an area of intense research. One method employs photo-lithography to pattern the underlying magnetic media and form the patterned cells.

SUMMARY

In one general aspect, the described embodiments are directed to an apparatus for reading patterned media and methods for reading the patterned media. In particular, the apparatus may sense data from more than one patterned cell at a time and determine positional information thereafter. In one embodiment, a magnetoresistive head configured to respond to magnetization states of patterned cells formed on a patterned medium detects the magnetization state of at least two patterned cells formed on the patterned medium. The magnetoresistive head generates a readback signal based on the magnetization state of the at least two patterned cells. A detector circuit coupled to the magnetoresistive head determines a bit pattern associated with the readback signal. A processor circuit coupled to the detector circuit determines positional information associated with the head relative to the at least two patterned cells based on the bit pattern.

FIGURES

The novel features of the various described embodiments are set forth with particularity in the appended claims. The various embodiments, however, both as to organization and methods of operation may be understood in accordance with the following description taken in conjunction with the accompanying drawings as follows.

FIGS. 10A, 10B, 10C, and 10D illustrate corresponding respective contour plots as functions of cross-track/down-track (timing phase) position of one embodiment of head for four distinct bit patterns.

Figure 11:
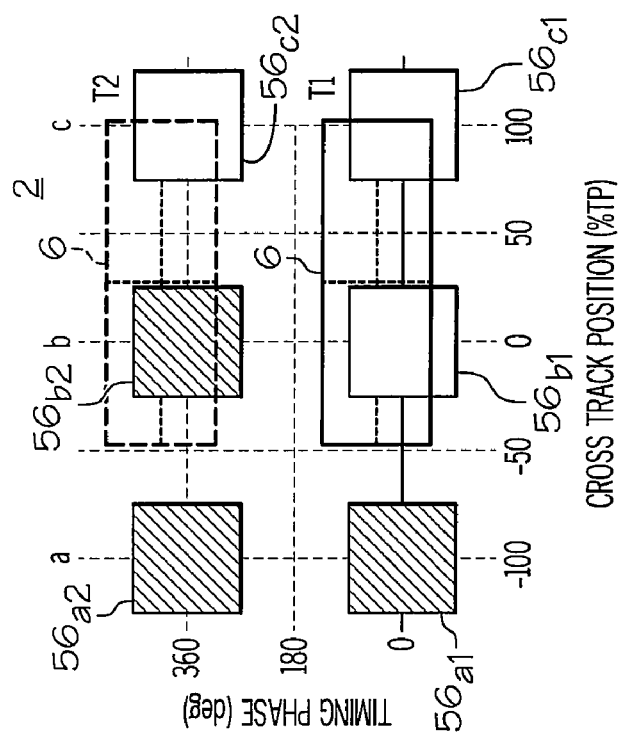

FIG. 11 illustrates the relationship between bit patterns formed by patterned cells and the location of one embodiment of a head at successive sampling times T1 and T2.

Figure 12:
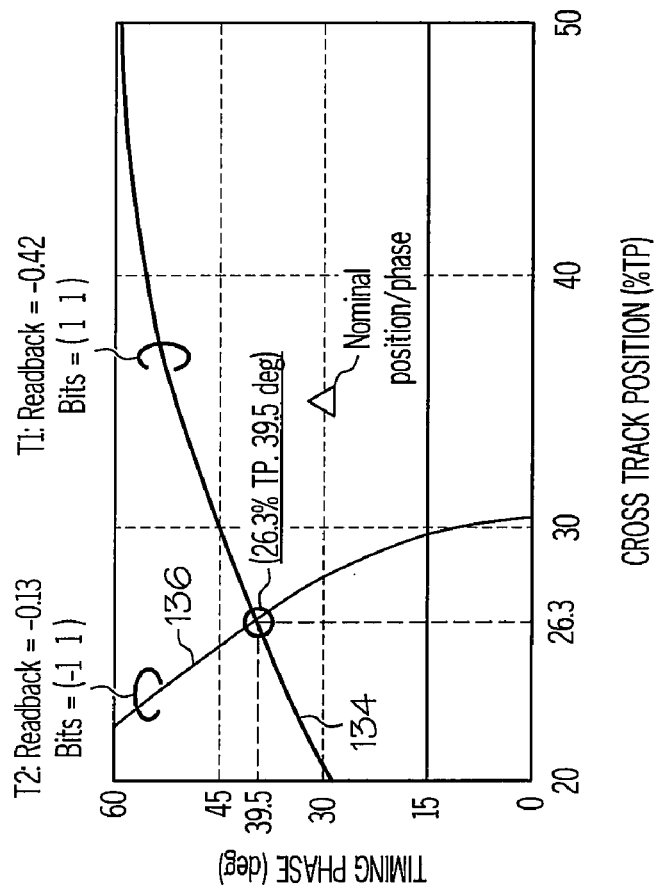

FIG. 12 illustrates the intersection of contour lines corresponding to the position of one embodiment of a head at successive sampling times T1 and T2, as shown in FIG. 11, for determining the bit patterns and the relative cross-track/down-track (timing phase) position of the head based on distinct bit patterns.

FIGS. 13A, 13B, 13C, 13D illustrate an array of patterned cells at several cross-track/down-track (timing phase) positions of one embodiment of a head.

Figure 14B:
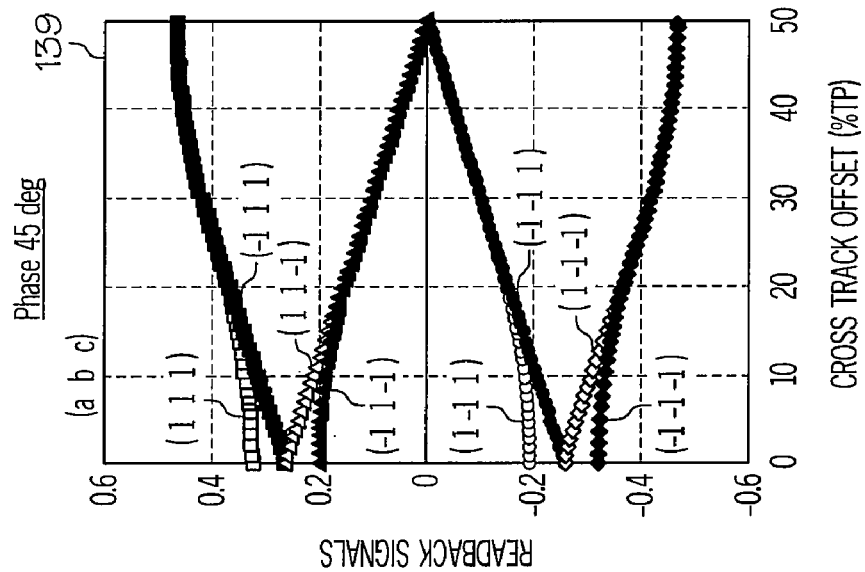
Figure 14A:
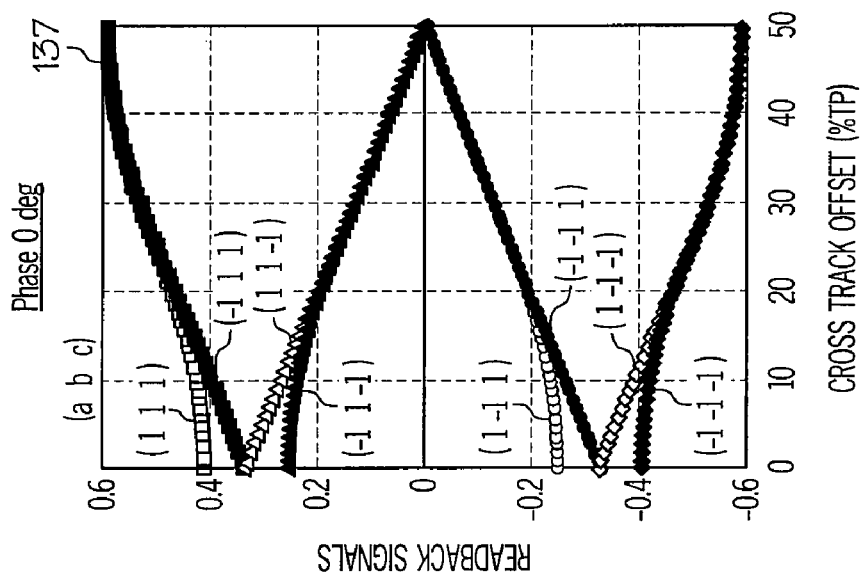
Figure 15G:
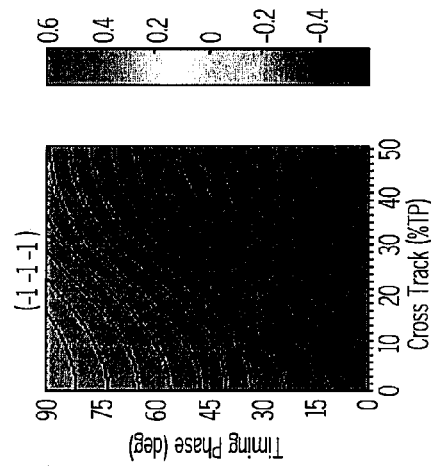
Figure 15H:
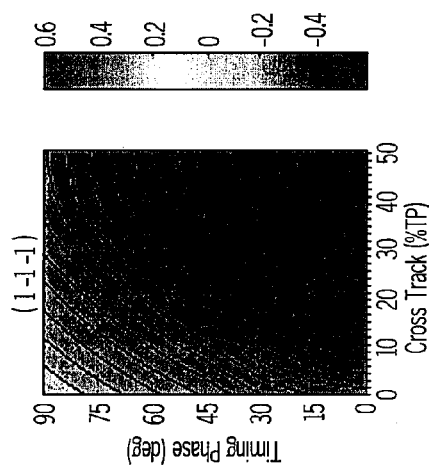
Figure 15E:
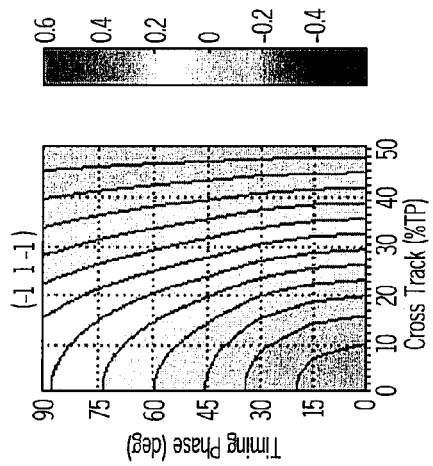
Figure 15F:
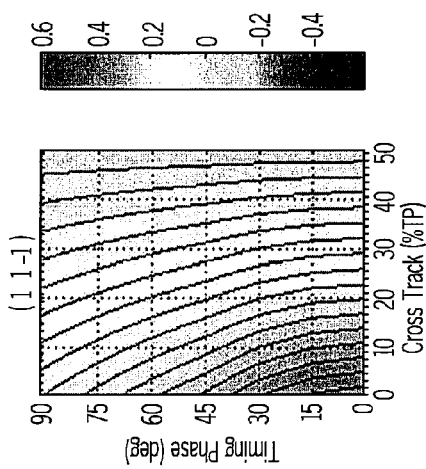

FIG. 14A is a plot of readback signals produced by one embodiment of a head versus cross-track position for a down-track (timing phase) position of 0 degrees for eight distinct combinations of bits.

FIG. 14B is a plot of readback signals produced by one embodiment of the head versus cross-track position for a timing phase (down-track) position of 45 degrees for the eight distinct combinations of bits.

FIGS. 15A-H illustrate contour plots corresponding to eight distinct readback signals produced by one embodiment of a head for eight bit patterns located in adjacent tracks (a, b, c) as functions of the cross-track/down-track (timing phase) position of the head.

Figure 16:
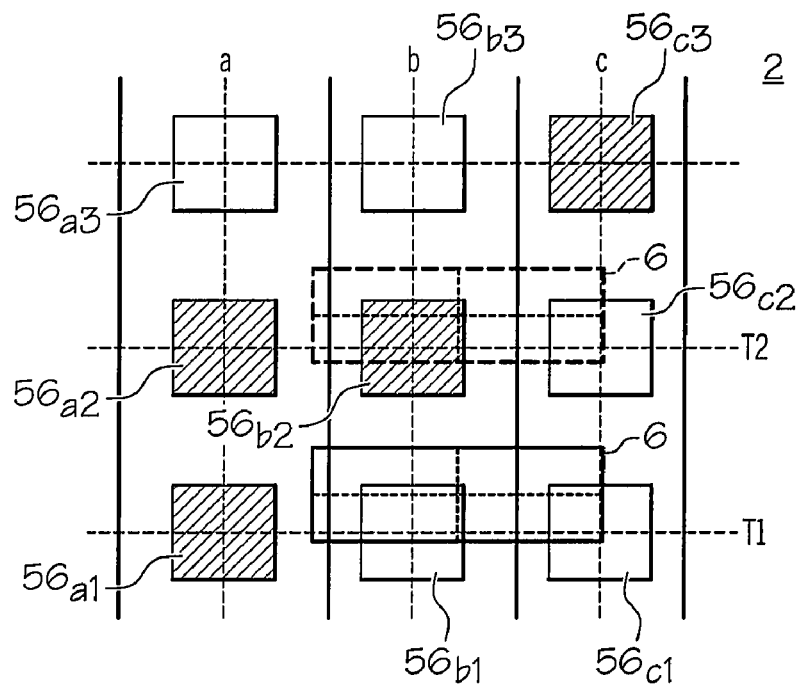

FIG. 16 illustrates a relationship between bit patterns and the location of one embodiment of the head at successive sampling times T1 and T2.

Figure 17:
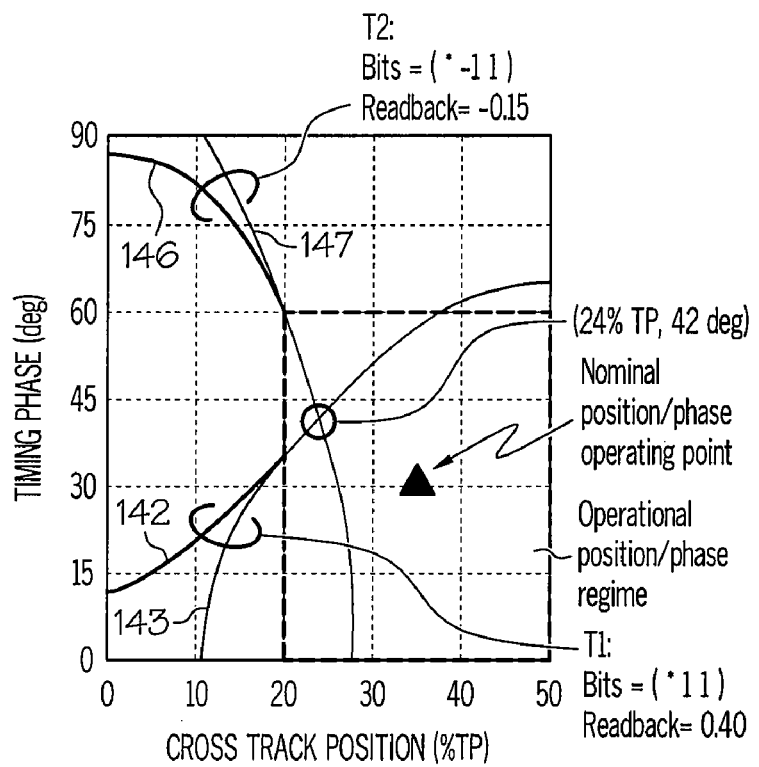

FIG. 17 illustrates the intersection of contour lines corresponding to the position of one embodiment of the head at successive sampling times T1 and T2, as shown in FIG. 16, for determining the bit patterns and the relative cross-track/down-track (timing phase) position of the head based on distinct bit patterns.

Figure 18:
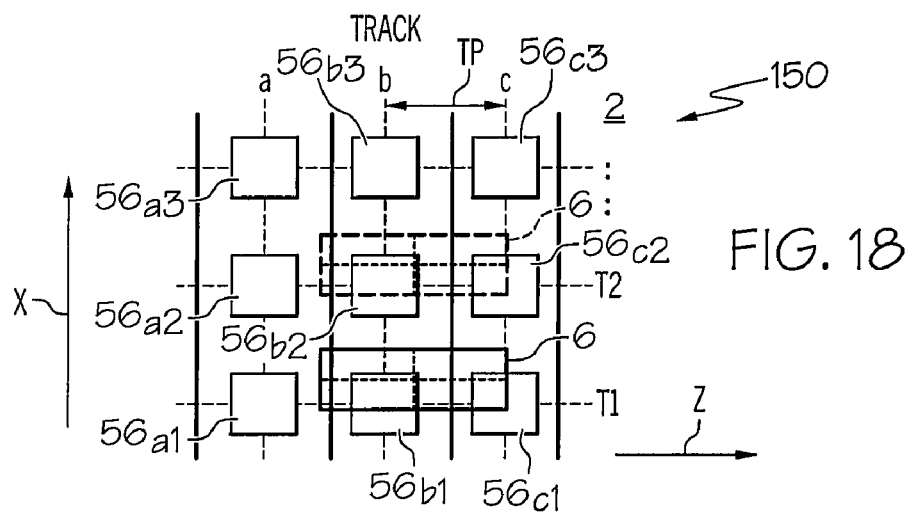

FIG. 18 illustrates one embodiment of a head orientation relative to the cross-track/down-track (timing phase) position in an array of patterned cells.

Figure 19:
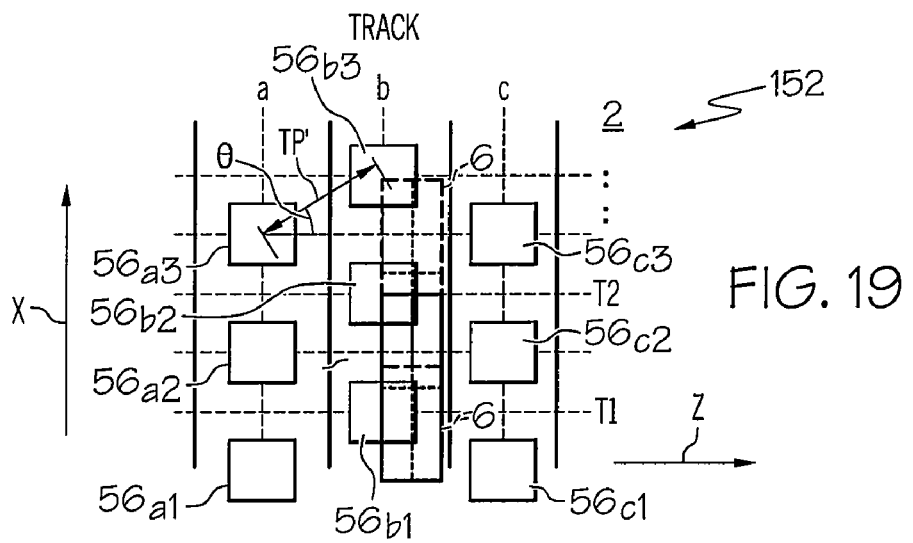

FIG. 19 illustrates one embodiment of a head orientation relative to the cross-track/down-track (timing phase) position in an array of patterned cells.

Figure 20:
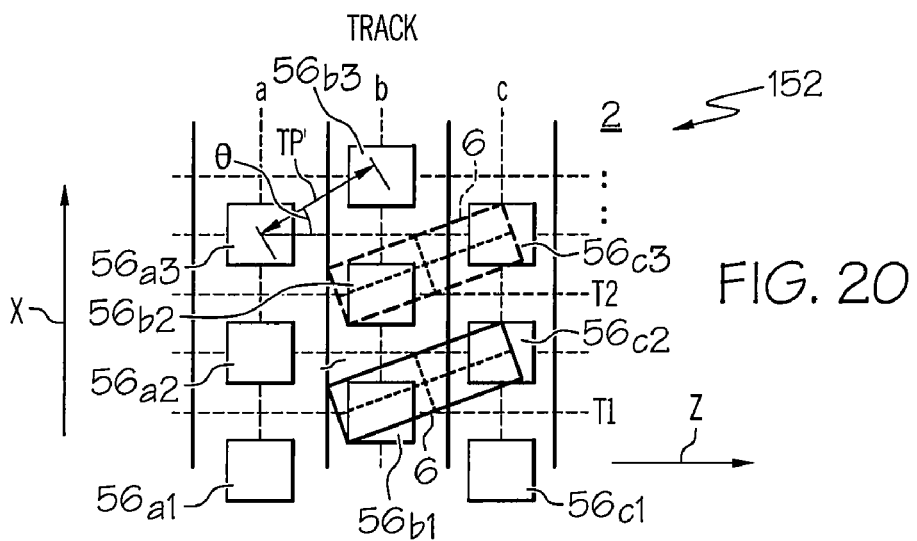

FIG. 20 illustrates one embodiment of the read head orientation relative to the cross-track/down-track (timing phase) position in the array of patterned cells.

Figure 21:
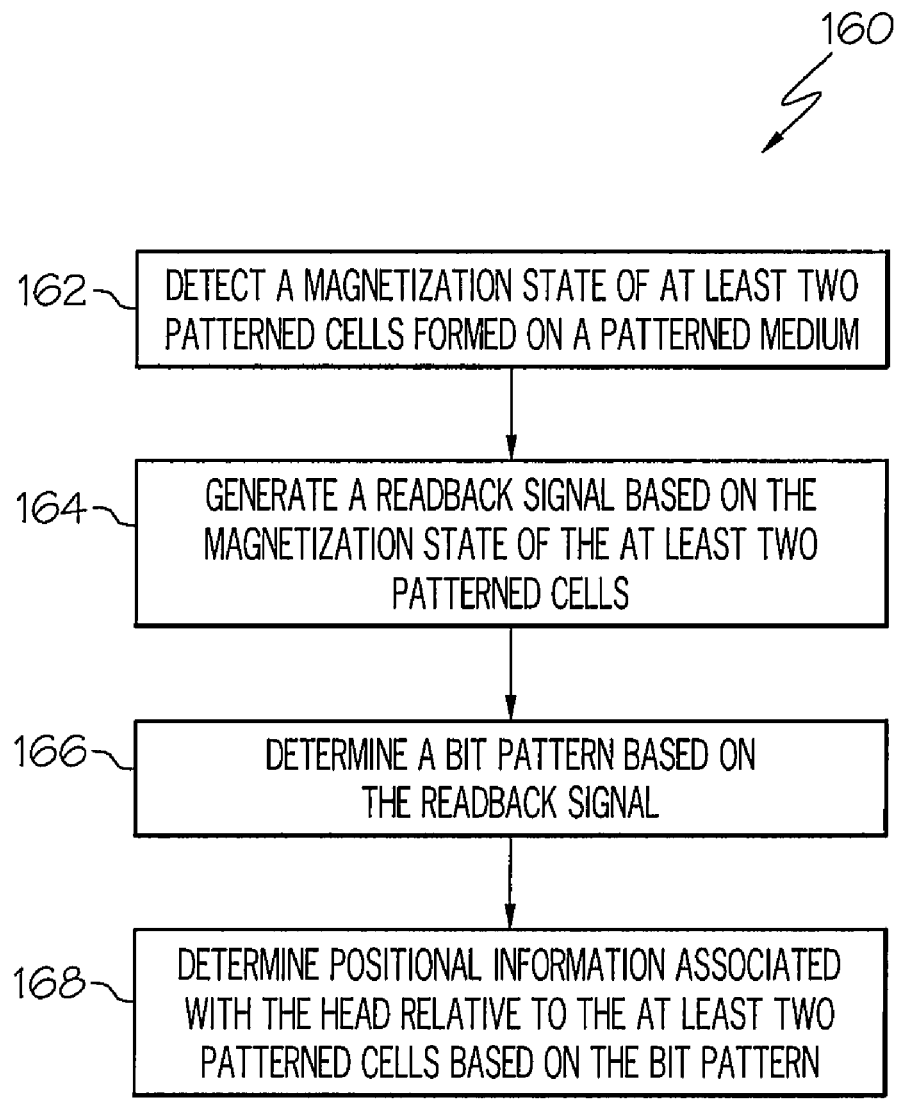

FIG. 21 illustrates a flow diagram of one embodiment of a method.

DESCRIPTION

Various embodiments are directed to apparatuses, systems, and methods for simultaneously determining bit patterns written on patterned media and positional information associated with the relative position of the head on patterned magnetic storage media. Numerous specific details are set forth to provide a thorough understanding of the overall structure, function, manufacture, and use of the embodiments as described in the specification and illustrated in the accompanying drawings. It will be understood by those skilled in the art, however, that the described embodiments may be practiced without the specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation.

It will be appreciated that for conciseness and clarity, spatial terms such as "vertical," "horizontal," "up," and "down" may be used herein with respect to the illustrated embodiments. However, these terms are not intended to be limiting and absolute.

The various apparatuses, systems, and methods in accordance with the described embodiments provide simultaneous detection of multiple bit patterns formed on patterned media and positional information associated with the head. The various embodiments may allow for increases in areal storage densities, increases data read/write rates, and provide simultaneous positional information signals for the servo control system using only the data stored in patterned cells formed on the patterned medium. In one embodiment, a head is dimensioned to cover and read multiple bits located in adjacent tracks simultaneously. In one embodiment, the head is configured to read arbitrary bit patterns located in adjacent tracks on the patterned media simultaneously. In one embodiment, the head may be located in a non-zero nominal cross-track position directly over multiple patterned cells located across multiple adjacent tracks formed on the patterned medium. In one embodiment, the head may be located in a non-zero nominal down-track (timing phase) position to provide positional information associated with the head without using specialized servo patterns formed on the patterned medium that are separate from the data storage area of the patterned medium. The cross-track (position)/down-track (timing phase) signals may be employed to synchronize the data readback sampling with the location of the patterned cells, e.g., patterned bits, formed on the patterned magnetic medium. In one embodiment, the bit patterns and the positional information associated with the head can be determined simultaneously within one half track of a nominal cross-track (position)/down-track (timing phase) location of the head. In one embodiment, signal processing techniques, e.g., detectors, demodulation circuits, may be employed to determine possible bit patterns on the patterned magnetic medium and the cross-track (position)/down-track (timing phase) positional information associated with the head based on readback signals produced by the head. In one embodiment, an algorithm in the form of executable instructions is executed by a processor, a signal processor, or a demodulator, alone or in combination, to determine the possible bit patterns associated with the readback signals. In one embodiment, the positional information of the head may be determined by the processor, signal processor, or demodulator, alone or in combination, based on the intersection of contour lines associated with the possible bit patterns based on the readback signals for a nominal range of cross-track (position)/down-track (timing phase) location of the head.

Although a conventional head, such as a finite track-width magnetoresistive (MR) head, may be used to read and write information from/to the patterned media, a new head configuration and signal processing techniques to exploit the advantages provided by patterned magnetic media are described in accordance with various embodiments. A head with dimensions several times larger than a single patterned cell or island of magnetization may be employed to simultaneously read multiple patterned cells. Accordingly, in one embodiment, a head for reading multiple tracks of patterned cells and demodulating techniques are disclosed for exploiting the information read from the multiple patterned cells simultaneously to control the operation of the hard disk drive.

Furthermore, in accordance with the described embodiments, a method for demodulating the information read from the multiple independent tracks of patterned cells is provided. Present signal processing and demodulation techniques for patterned media are not suitable for reading arbitrary bit patterns located in adjacent tracks simultaneously. Existing techniques for determining head position signals require specialized patterns to be formed on the disk that are separate from the data storage area on the disk. The disk manufacturing process may be simplified by eliminating these specialized patterns for determining cross-track position and down-track position (timing phase) within one half track of a nominal position of the head. Accordingly, the described embodiments provide apparatuses, systems, and methods for determining both the cross-track position and the down-track (timing phase) position of the head simultaneously.

In accordance with the described embodiments, multiple patterned cells in patterned magnetic media may be read simultaneously and servo feedback information such as position error signals and timing recovery signals may be exploited to eliminate the need to form specialized patterns on the media at the time of manufacturing. In accordance with the described embodiments, both the cross-track and down-track (timing phase) positions of the head are simultaneously determined using the information concurrently read from the multiple patterned cells. The simultaneous reading of multi track bit patterns and the detection of position information on pattern media provides improved reading rates as well as improved servo and timing recovery techniques for synchronizing information readback sampling with the locations of the patterned bits.

Figure 1:
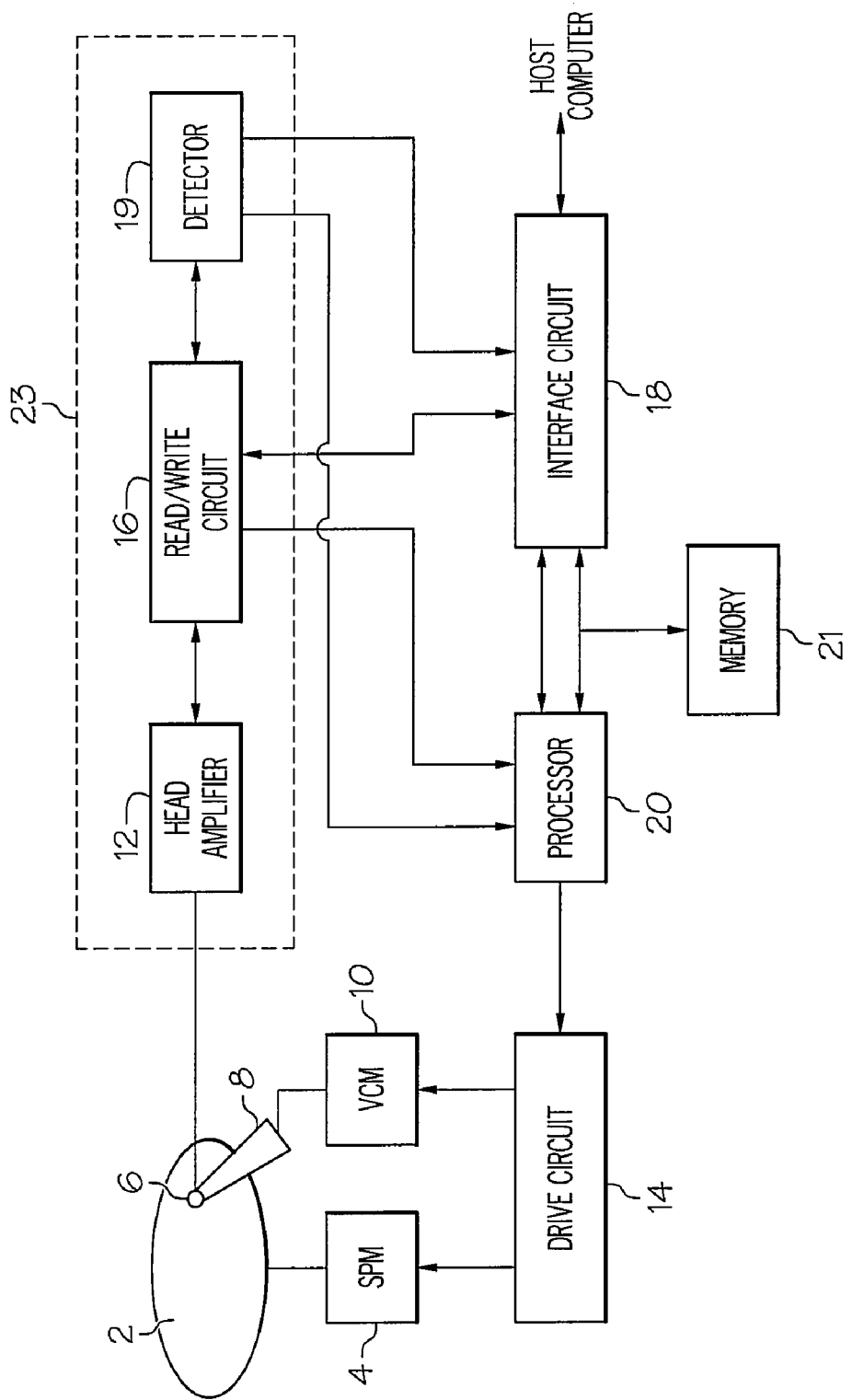
FIG. 1 is a schematic block diagram showing the configuration of one embodiment of a magnetic disk drive.

FIG. 1 is a schematic block diagram showing the configuration of one embodiment of a magnetic disk drive. The magnetic disk drive comprises a magnetic disk comprising a patterned storage medium 2, a spindle motor (SPM) 4, a head element (head) 6, a head arm 8, a voice coil motor (VCM) 10, a head amplifier 12, a drive circuit 14, a read/write circuit 16, a detector circuit 19 (detector), an interface circuit 18, a processor circuit 20, and a memory circuit 21.

The patterned medium 2 comprises a patterned storage medium where information is stored in a uniform array of patterned cells, storing one bit per cell. The magnetic disk drive write head may write information along a plurality of concentric tracks formed on the patterned surface of the patterned medium 2 using a magnetic field. Each track comprises a plurality of patterned cells formed on the patterned medium 2 using known techniques at the time of manufacture. In one embodiment, the patterned cell patterns are formed on the patterned medium 2 using photo-lithographic techniques, although other techniques may be used without limitation.

The patterned medium 2 is rotated by the SPM 4 at high speed. The head 6 is mounted on the tip of the head arm 8. In one embodiment, the head 6 is a finite width disk read/write head to read data from or write data to the patterned medium 2. In one embodiment, the head 6 may be a magnetoresistive (MR) head configured to read and write information in the patterned medium 2. In various embodiments, the MR head 6 may be an anisotropic magnetoresistive (AMR) head, a giant magnetoresistive (GMR), or a tunneling magnetoresistive (TMR) head. The direction of the head arm 8 is changed by the VCM 10 so as to move the head 6 from one track to another, thus achieving a seek operation. In a data write or data read operation, the head 6 is positioned close to the surface of the rotating patterned medium 2. In a write operation, the head 6 forms a magnetization pattern on the surface of the patterned medium 2 which varies along the track. In a read operation, on the other hand, the head 6 senses changes in the magnetic field generated according to the magnetization pattern formed on the surface of the patterned medium 2. The SPM 4 and the VCM 10 are driven by the drive circuit 14 under the control of the processor circuit 20.

The head 6 is connected to the read/write circuit 16 through the head amplifier 12. The head amplifier 12 amplifies the electrical signal input to or output received from the head 6. The head 6 is dimensioned to read multiple tracks of patterned cells simultaneously. The read portion of the read/write circuit 16 in combination with a detector circuit 19 convert the readback signals received from the head amplifier 12 into data bits, which are provided to the processor circuit 20. The processor circuit 20 converts the data bits received from the read portion of the read/write circuit 16 to determine cross-track and down-track (timing phase) positions of the head 6. Although it is shown as a separate component, the detector circuit 19 may be formed integrally with the read/write circuit 16 or other circuits without limitation. The detector circuit 19 is configured to demodulate the readback signals read from the patterned medium 2 and output the demodulated to the processor circuit 20.

The read/write circuit 16 may comprise the detector circuit 19, which may be a stand alone circuit, or may be formed integrally with the read/write circuit 16, the detector circuit 19, or any other suitable circuits without limiting the described embodiments. In various embodiments the detector circuit 19 may be a slicer, a demodulator, or any single-track or multi-track data detection circuit (e.g., Viterbi, modified Viterbi, and the like) that is capable of providing the data bits representative of the patterned cells to the detector circuit 19. In various embodiments, the detector circuit 19 may be implemented as a digital signal processor (DSP), a specialized microprocessor, or as special purpose-built hardware such as an application-specific integrated circuit (ASIC). Additional technologies may be used for the detector circuit 19 including, without limitation, more powerful general purpose microprocessors, field-programmable gate arrays (FPGAs), digital signal controllers, among others.

The detector circuit 19 may implement known single-track data detection strategies comprising of sampling the readback signals, equalizing them to a partial response or generalized partial response target, and applying such equalized samples to Viterbi-type detection methods or may employ multi-track data detection methods such as those reported in S. Nabavi and B. V. K. Vijaya Kumar, "Mitigating the Effects of Track Mis-Registration in Bit-Patterned Media," *Intl. Communications Conference (ICC)*, Beijing, May 2008 and S. Nabavi, B. V. K. Vijaya Kumar and J. Zhu, "Modifying Viterbi algorithm to mitigate inter-track interference for bit-patterned media," *IEEE Trans. Magnetics*, vol. 43, 2274-2276, 2007, each of which is incorporated herein by reference. The outputs from the detector circuit 19 will be input to decoders of error correction codes (ECC) such as Reed-Solomon codes, low density parity check (LDPC) codes or Turbo codes. Also, those skilled in the art would know that soft information as well as hard information can be obtained from the detector circuit 19. Those skilled in the art would also know how to include run length limit (RLL) codes and constraints, as needed.

The information stored in the patterned medium is read from the multiple patterned cells simultaneously and position information may be extracted therefrom to control the operation of the hard disk drive. The detector circuit 19, which may form a portion of the read/write circuit 16, detects data written to the patterned medium 2 based on the electrical signal received from the head 6, the readback signal. The detector circuit 19 outputs data bits extracted from the readback signal to the processor circuit 20. An algorithm in the form of executable instructions may be executed by the processor circuit 20 and/or the host computer to determine the positional information of the head 6 based on the data bits received from the detector circuit 19, which are based on the readback signals produced by the head 6 at successive sampling times. The positional information of the head 6 is then output by the processor circuit 20 to the drive circuit 14 to control the position of the head 6. Furthermore, the read/write circuit 16 transmits/receives user data to/from the host computer to which the magnetic disk drive is connected. The electrical circuits, i.e., the head amplifier 12, the "read portion" of the read/write circuit 16 that transform the physical magnetic field changes according to the magnetization pattern formed on the surface of the patterned medium 2 into abstract bits, and the detector circuit 19 may be referred to as a read channel 23.

In a data write operation, the interface circuit 18 receives a write address and user data from the host computer. The interface circuit 18 outputs the write address to the processor circuit 20 and buffers the user data in an internal memory and/or the memory circuit 21. The processor circuit 20 issues a control instruction to the drive circuit 14 based on the write address, so that, for example, the drive circuit 14 drives the VCM 10 to move the head 6 to the track corresponding to the write address. Further, the processor circuit 20 calculates the timing at which the track corresponding to the write address will reach the position of the head 6 based on the positional information on the head 6 supplied by the read/write circuit 16 and/or the detector circuit 19. At a timing matching the calculated timing, the read/write circuit 16 reads the user data (which is to be written to the write address) from the buffer memory of the interface circuit 18, and/or the memory circuit 21. The read/write circuit 16 modulates the user data and then writes it to the disk 2 through the head 6.

In a data read operation, on the other hand, the interface circuit 18 receives a read address from the host computer. The interface circuit 18 then outputs the read address to the processor circuit 20. The processor circuit 20 issues a control instruction to the drive circuit 14 based on the read address, so that, for example, the drive circuit 14 drives the VCM 10 to move the head 6 to the track corresponding to the read address. The read/write circuit 16 receives the readback signal produced by the head 6 and determines the positional information of the head 6 based on cross-track and down-track contour plots according to the magnetic state of patterned cells 56 (FIGS. 2, 3, 4, for example) passing under the head 6 and outputs it to the processor circuit 20. Furthermore, the detector circuit 19 demodulates the user data stored in patterned magnetic cells and outputs it to the processor circuit 20 and/or the interface circuit 18. The interface circuit 18 buffers the user data. Based on the positional information on the head 6 supplied from the read/write circuit 16, the processor circuit 20 determines the timing at which the sector corresponding to the read address was read. The interface circuit 18 outputs the user data read at the determined timing to the host computer from, its buffer memory, or the memory circuit 21.

The memory circuit 21 may be a volatile or non-volatile memory, removable or non-removable memory, erasable or non-erasable memory, writeable or re-writeable memory. The memory circuit 21 may be coupled to the read/write circuit 16, the interface circuit 18, and/or the processor circuit 20, and/or may be formed integrally within the interface circuit 18. The memory circuit 21 may store contour plots in the form of a look-up table or executable program instructions to generate the contour plots as a function. The contour plots may be modeled in the form of an equation based on coefficients stored in the memory circuit 21.

In one embodiment, the read channel 23 circuits, i.e., the head amplifier 12, the read/write 16, and/or the detector circuit 19 may be integrated on a single integrated circuit. In other embodiments, the head amplifier 12, the drive circuit 14, the read/write circuit 16, the detector circuit 19, the interface circuit 18, the processor circuit 20, and the memory circuit 21, and/or any ECC or decoder functions may be integrated on to a single piece of silicon and may be referred to a system-on-a-chip (SOC). The SOC may be manufactured in standard digital complementary metal oxide semiconductor (CMOS) process technology.

Figure 2:
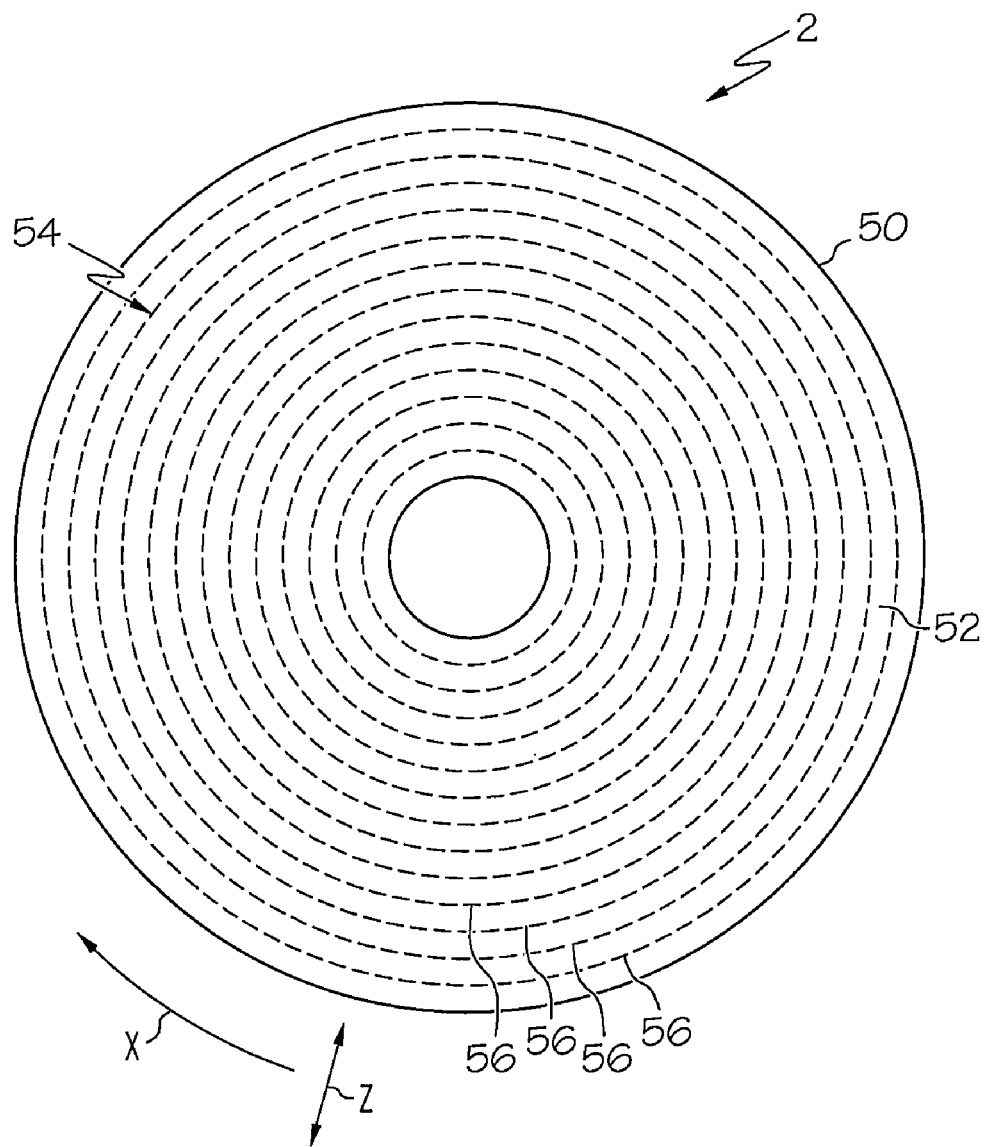
FIG. 2 illustrates a plan view of one embodiment of a patterned medium.

FIG. 2 illustrates a plan view of one embodiment of the patterned medium 2. The patterned medium 2 comprises a disk shaped substrate 50 and a magnetic recording layer 52. An array 54 of uniform discrete patterned cells (or patterned bits) 56 is formed concentrically on the patterned medium 2. As previously discussed, the patterned medium 2 is a magnetic storage technology used to record data in a uniform array 54 of discrete patterned cells 56, storing one bit per cell, as opposed to a magnetic medium used for conventional disk drive technology, where each bit may be stored across a few hundred magnetic grains on the magnetic medium. In various embodiments, the patterned medium 2 may comprise arrays 54 of patterned cells 56 configured as a square grid, a rectangular grid, a hexagonal grid, a circular grid, or some other regular grid. In various embodiments, patterned media technology provides increased areal density and storage capacity of the patterned medium 2. In the patterned medium 2, the magnetic recording layer 52 is created as the ordered array 54 of highly uniform magnetized regions, referred to herein as patterned cells 56, but may be referred to as islands or patterned bits, for example, where each patterned cell 56 is capable of storing an individual bit.

The relative placement of the patterned cells 56 located in adjacent tracks a, b, c, . . . up to n tracks, where n is any suitable integer, on the patterned medium 2 provides opportunities for extracting information from the readback signals received by the head 6 and the detector circuit 19 portion of the read/write circuit 16. This is possible because the bit combinations and relative positions of these bits are known. In accordance with the described embodiments, the head 6 is configured to straddle more than one track and produces a readback signal comprising information about the bit pattern from more than one (e.g., two or more) adjacent tracks. This information can be used to determine the bits and the two dimensional position of the head 6. The cross-track position in cross-track direction x provides the position error signal (PES) and the down-track position in down-track direction z provides the timing error signal (TES). Thus, it is possible to simultaneously generate the PES and the TES while reading data from multiple tracks. In one embodiment, the nominal cross-track position of the head 6 in cross-track direction x is located away from the center of the track of the patterned cells 56 (e.g., patterned bits), and the nominal down-track position (e.g., timing phase) in down-track z is located slightly away from 0 degrees.

Figure 3:
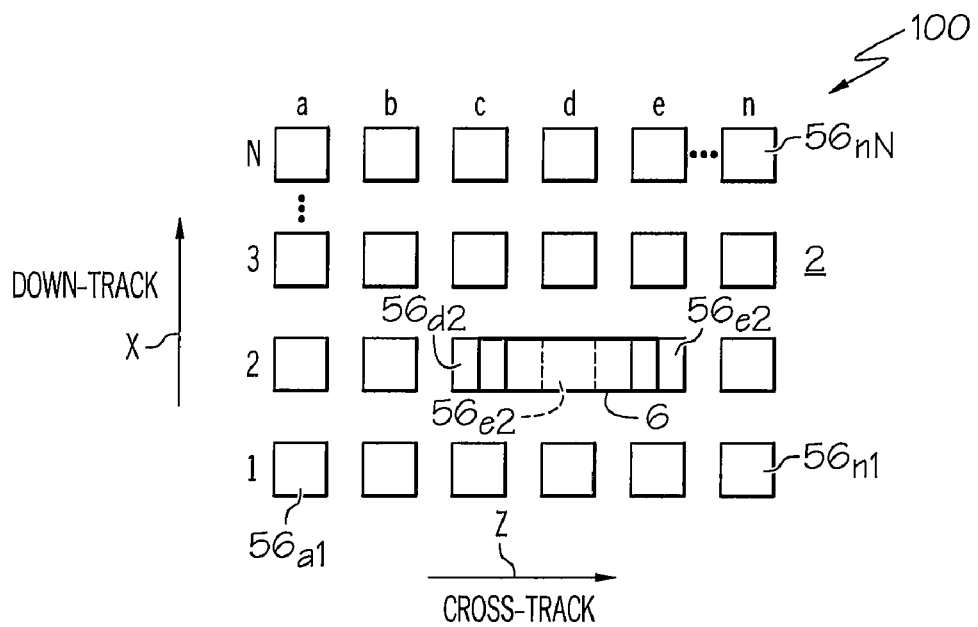
FIG. 3 is a schematic illustration of one embodiment of a portion of an array formed on a patterned disk and one embodiment of a head dimensioned to read multiple patterned cells (magnetized regions, patterned bits) formed on the patterned disk.

FIG. 3 is a schematic illustration of one embodiment of a portion of an array 100 formed on the patterned medium 2 and one embodiment of the head 6 dimensioned to read multiple patterned cells 56 (magnetized regions, patterned bits) formed on the patterned medium 2. For illustration purposes the array 100 comprises an n-by-N grid of square patterned cells 56 arranged in a square grid, where n is the number of tracks and N is the number of patterned cells 56 along a single track. The values n and N may be any suitable integer value. Those skilled in the art will appreciate that the patterned cells 56 may be distributed on the surface of the patterned medium 2 as shown in FIG. 2. Down-track direction is indicated by arrow x and cross-track direction is indicated by arrow z. For convenience and clarity throughout the remainder of the present specification the magnetized regions or patterned bits will be referred to as the patterned cells 56.

Figure 4:
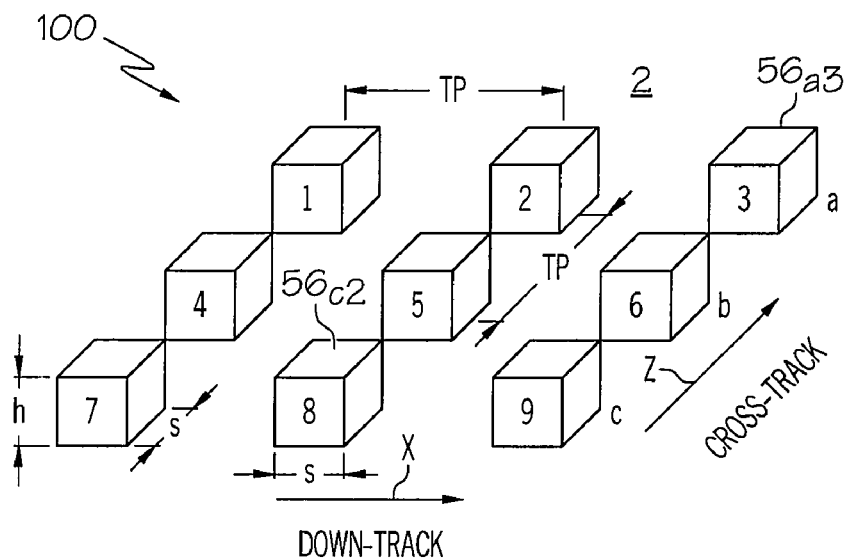
FIG. 4 is a perspective view of an array of patterned cells formed on a patterned medium.

As shown in FIG. 3, the patterned cells 56 are configured in a square grid with each element of the grid representing a single patterned bit. Each one of the patterned cells 56 has a dimension in the (x, z) plane and a film thickness in the y direction (e.g., "h" as shown in FIG. 4). Nevertheless, other geometric configurations or arrangements are contemplated to be within the scope of the described embodiments. For example, as previously discussed, the patterned cells 56 may be arranged in any regular configuration such as a square grid, a rectangular grid, a hexagonal grid, a circular grid, or some other regular grid without limitation.

The patterned cells 56 are arranged in multiple parallel tracks a, b, c, . . . , n formed on the patterned medium 2. For convenience and clarity the tracks are labeled a, b, c, . . . ,n. A particular patterned cell $56_{nN}$ is referenced based on its position in the array 100. For example, the patterned cells $56_{a1}$ to $56_{aN}$ are located in the down-track direction of track a, and patterned cells $56_{n1}$ to $56_{nN}$ are located in the down-track direction of track n.

The head 6 may be any suitable head. In accordance with the described embodiments, the head 6 may be a magnetoresistive (MR) head dimensioned to detect (read) and/or modify (write) the magnetization of the patterned cells 56 immediately under it. The footprint of the head 6 is dimensioned such that the head 6 is large enough to cover more than one (e.g., two or more) patterned cells 56 immediately below the head 6 across two or more tracks. As shown in FIG. 3, for example, the head 6 is centered over the patterned cell $56_{d2}$ (shown in phantom) located on track d. The head 6 spans a specified fraction of patterned cells $56_{c2}$, $56_{e2}$ located in adjacent tracks c and e. As shown, the head 6 is partially located over patterned cells $56_{c2}$, $56_{e2}$. In the example shown in FIG. 3, the head 6 is configured to span three patterned cells $56_{c2}$, $56_{d2}$, and $56_{e2}$. It will be appreciated that the embodiments are not limited as such and other configurations of patterned cells 56 per head 6 are within the scope of the described embodiments.

FIG. 4 is a perspective view of an array of patterned cells 56 formed on the patterned medium 2. The array 100 of patterned cells 56 comprise multiple tracks a, b, c arranged in a square grid. As shown in FIG. 4, each of the patterned cells 56 may have a square s-by-s square footprint dimension in the (x, z) plane and a thickness h in the y direction. The thickness h in the y direction may be the thickness of the magnetic medium. The center-to-center spacing "TP" between adjacent patterned cells 56 is 2s. The patterned cells 56 may be read with a finite width shielded MR head 6 (FIGS. 1, 3) with infinitely wide shields. Nevertheless, other geometric configurations of the patterned cells 56 are contemplated to be within the scope of the described embodiments. For example, the patterned cells 56 may be in the form of a square, as illustrated in FIGS. 3 and 4, or may be configured in any regular geometric configuration in the form of a rectangle, hexagon, circle, or some other regular geometric shape without limitation.

Figure 5:
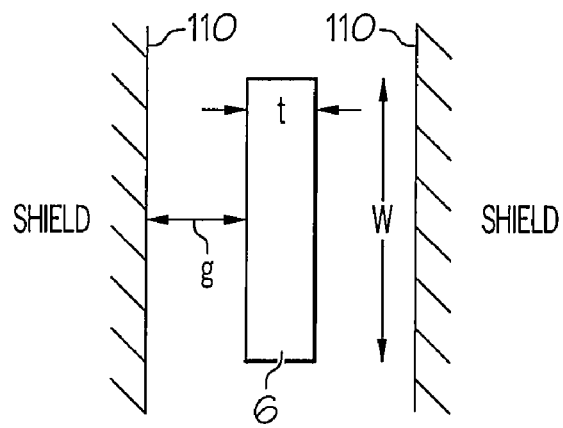
FIG. 5 is a top view of a schematic illustration of one embodiment of a shielded magnetoresistive (MR) head.

FIG. 5 is a top view of a schematic illustration of one embodiment of a shielded MR head 6. As shown in FIG. 5, W is the width of the head 6, t is the thickness of the head 6, and g is the gap between the shield 110 and the head 6. It will be appreciated that varying the dimensions of the W, t, and g varies the surface sensitivity function of the head 6 as more particularly described in the following description with reference to FIGS. 6 and 7.

Figure 6:
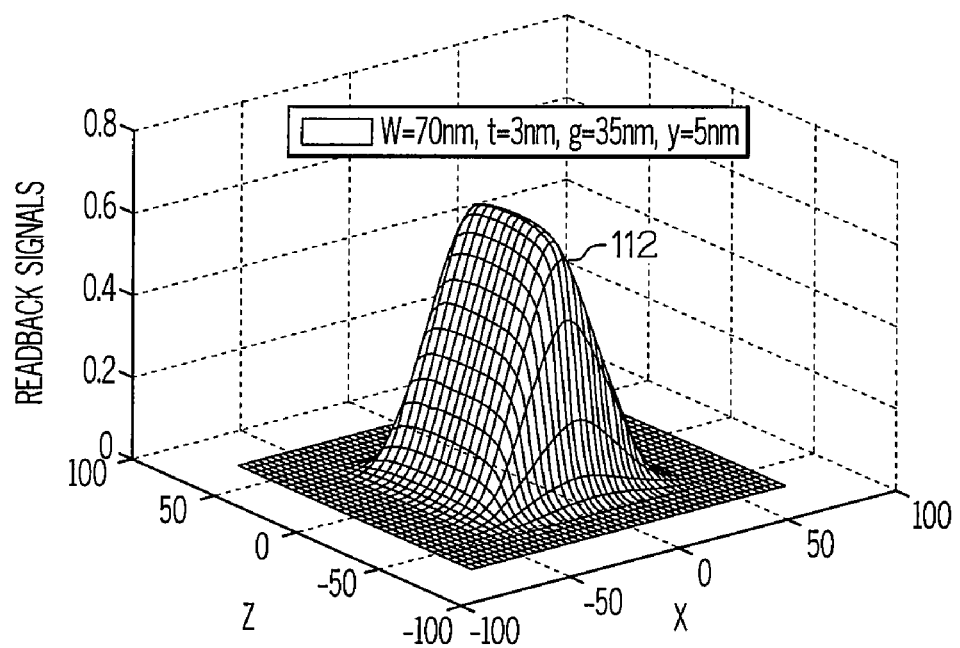
FIG. 6 illustrates a surface sensitivity plot of a head potential distribution versus down-track distance in direction z and cross-track distance in direction x for a shielded MR head with infinitely wide shields.

FIG. 6 illustrates a surface sensitivity plot 112 of a head potential distribution versus down-track distance in direction z and cross-track distance in direction x for a shielded MR head 6 (FIGS. 1, 3, 5) with infinitely wide shields. The surface sensitivity plot 112 may be generated by simulation or empirical methods using measurement data. The width W of the head 6 is shown along the cross-track direction z and the thickness t is shown along the down-track direction x. The readback signal is shown along the vertical axis. The head 6 has a width W=70 nm, thickness t=3 nm, and gap g=35 nm and the surface sensitivity plot 112 of the head 6 potential distribution is obtained at y=5 nm. The readback signal produced by the head 6 centered at (0, 0) from a patterned cell 56 (FIGS, 2, 3, 4,) centered at ($x_0$, $z_0$) is the integral of the head 6 potential distribution over that patterned cell 56. A read channel model for patterned media is described in "A New Read Channel Model for Patterned Media Storage," Karakulak, S.; Siegel, P. H.; Wolf, J. K.; Bertram, H. N.; *IEEE Transactions on Magnetics*, Volume 44, Issue 1, Part 2, January 1148 Pages 193-197, which is incorporated herein by reference. Another read channel model for patterned media is described in S. Nabavi, B. V. K. Vijaya Kumar and J. Bain, "Two-dimensional pulse response and media noise modeling for bit-patterned media channels," *IEEE Intern. Magnetics Conference*, Madrid, Spain, May 2008, which is incorporated herein by reference. The readback signal produced by the head 6 based on a predetermined distance between the head 6 and the surface of the patterned medium 2 (FIGS. 2, 3, 4), and the cross-track and down-track positions of the head 6 in response to the magnetization of the patterned cells 56 can be obtained from the surface sensitivity plot 112 potential distribution of the head 6. A new surface plot of the potential distribution of the head 6 versus down-track distance in direction z and cross-track distance in direction x for the head 6 may be obtained for a particular head based on the dimension of the head (W, t, g) and distance between the head 6 and the surface of the patterned medium 2. Two-dimensional contour plots with cross-track position in direction x shown along the horizontal axis and the down-track position in direction y shown along the vertical axis may be obtained for a given distance between the head 6 and the surface of the patterned medium 2. These contour plots may be stored in the memory circuit 21 (FIG. 1) in the form of a look-up table, as a function, or as coefficients of the function. The memory circuit 21 may be coupled to the read/write circuit 16, the interface circuit 18, and/or the processor circuit 20 (all shown in FIG. 1). The necessary electrical circuitry may be implemented as part of the read/write circuit 16, the interface circuit 18, the detector circuit 19, and/or the processor circuit 20, or may be implemented as a DSP, a specialized microprocessor, or as special purpose-built hardware such as an ASIC, general purpose microprocessor, FPGA, digital signal controller, among others. The processor circuit 20 may be used to execute executable instructions stored in the memory circuit 21 to compute the necessary calculations to determine the cross-track and down-track positions of the head 6 based on the value of the readback signal and the polarity of the patterned cell 56 (FIGS. 2, 3, 4) as described in more detail below.

Figure 7:
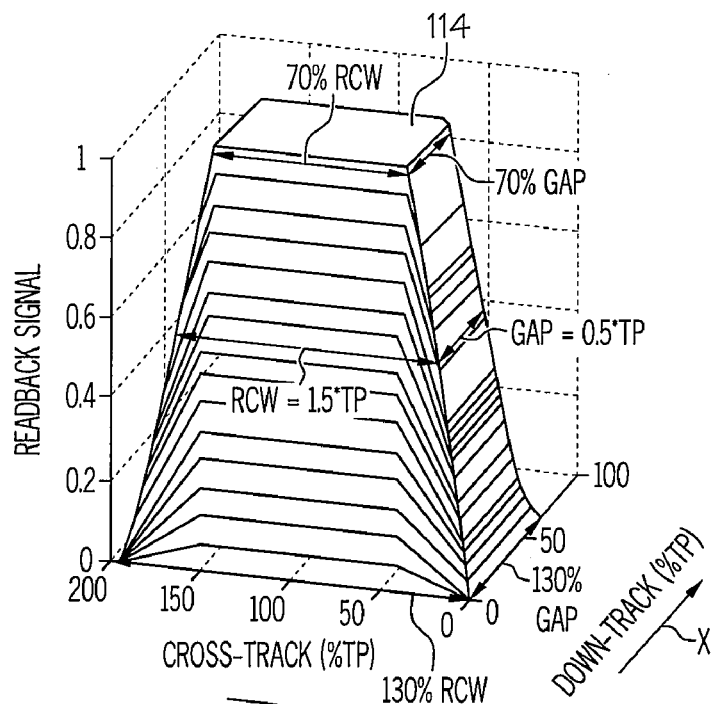
FIG. 7 illustrates a surface sensitivity plot of a potential distribution versus down-track distance in direction z and cross-track distance in direction x for one embodiment of a rectangular head.
Figure 8:
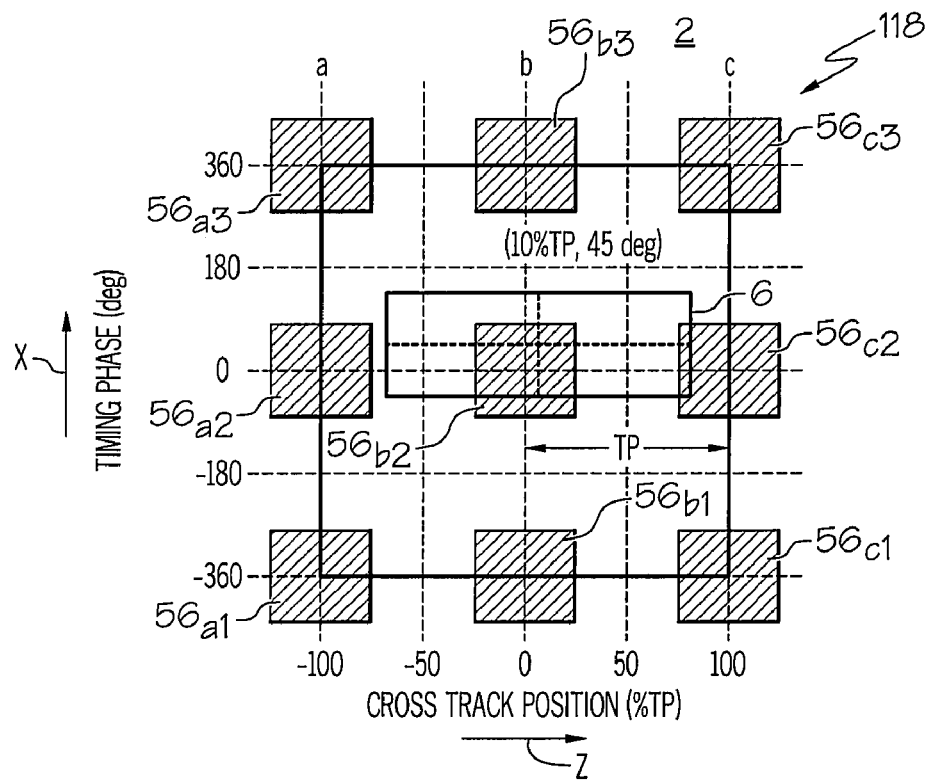
FIG. 8 is a schematic view of one embodiment of head positioned over an array of patterned cells.

FIG. 7 illustrates a surface sensitivity plot 114 of a potential distribution versus down-track position of the head 6 (FIGS. 1, 3, 5) in direction z and cross-track position of the head 6 in direction x for one embodiment of the head 6 having a rectangular shape. The width W of the head 6 is shown along the cross-track direction z and the thickness t is shown along the down-track direction x. The readback signal is shown along the vertical axis. The readback signal produced the head 6 is a function of the dimensions of the head (W and t) and the size of the gap between the head 6 and the surface of the patterned medium 2 (FIGS. 2, 3, 4). The vertical direction represents the potential distribution of the head 6. As illustrated in FIG. 8, the head 6 has a width W of 1.5 times the track pitch (TP), where TP is the center-to-center distance between adjacent patterned cells (e.g., $56_{b2}$, $56_{c2}$ as shown in FIG. 8) in the cross-track direction z, and a thickness t approximately equal to the side dimension of the patterned cell 56 in the down-track direction x or 0.5 times the TP. Stated otherwise, the TP is the center-to-center distance between patterned cells $56_{b2}$, $56_{c2}$ located in adjacent data tracks as shown in FIG. 8. The surface sensitivity plot 114 of the potential distribution of the head 6 may be determined based on a predetermined distance between the head 6 and the surface of the patterned medium 2, the cross-track position in % TP, and the down-track position in % TP of the head 6. The sensitivity function 114 can be determined by varying the dimensions of the head 6 and the gap distance between the head 6 and the surface of the patterned medium 2. The results may be stored in the memory circuit 21 (FIG. 1) in the form of a look-up table, as a function, or coefficients of the function, which may be modeled or determined empirically to provide the desired cross-track and down-track position of the head 6 based on the readback signal produced by the head 6. An algorithm, in the form of executable instructions in accordance with the described embodiments, may be stored in the memory circuit 21. The executable instructions may be executed by the processor circuit 20 (FIG. 1) based on the data bits received from the detector circuit 19 (FIG. 1), or the host computer, to obtain the bit values for multiple patterned cells 56, and the simultaneous PES and TES necessary to synchronize the data readback sampling with the location of a particular patterned cell 56.

As may be expected, the sensitivity of the head 6 (FIGS. 1, 3, 5) decreases as the distance between the head 6 and the surface of the patterned medium 2 increases. In one embodiment, the surface sensitivity plot 114 of the potential distribution versus down-track distance in direction z and cross-track distance in direction x for the head 6 may be determined at a nominal distance y between the head 6 and the surface of the patterned medium 2, a nominal width W of 1.5(TP), e.g., 1.5 times the center-to-center cross-track distance between two adjacent patterned cells 56 in the cross-track direction z (FIG. 8), and a nominal thickness t of 0.5(TP), e.g., 0.5 times the center-to-center cross-track distance between two adjacent patterned cells 56 in the down-track direction x. Based on these parameters, the contour plots may be stored in the memory circuit 21 (FIG. 1) in the form of a look-up table or executable program instructions suitable to generate the contour plots as a function. The contour plots may be modeled in the form of an equation based on coefficients stored in the memory circuit 21.

FIG. 8 is a schematic view of one embodiment of the head 6 positioned over an array 118 of patterned cells 56. For illustration purposes the array 118 comprises a three-by-three grid of nine square patterned cells 56 arranged in a square grid. Those skilled in the art will appreciate that the patterned cells 56 are distributed over the surface of the patterned medium 2 as shown in FIG. 2. The tracks are labeled a, b, c. The outline or footprint of one embodiment of the head 6 (shown schematically see-through for clarity) is positioned over predetermined fractions of two patterned cells $56_{b2}$ (in track b) and $56_{c2}$ (in track c). As previously discussed, in one embodiment the head 6 has a width W of 1.5(TP) and a thickness t of 0.5(TP). In the description that follows, the position of the head 6 in the cross-track direction z will be expressed as a percentage of the track pitch (% TP, where % is ±100%) along the horizontal axis and the position of the head 6 in the down-track direction x is indicated in degrees (±360 degrees) of timing phase along the vertical axis. As shown in FIG. 8, the head 6 is positioned slightly off-center with the middle patterned cell $56_{b2}$ in the cross-track direction z and the down-track direction x, to ensure that the head 6 covers at least two patterned cells $56_{b2}$ and $56_{c2}$. As shown in FIG. 8, the head 6 is offset by 10% TP in the cross-track direction z and by 45 degrees in the down-track direction x. An offset of 100% TP corresponds to a shift of a full patterned cell 56 in the cross-track direction z. The timing phase is the center-to-center shift between two down-track patterned cells 56. For example, as shown in FIG. 8, the timing phase is given by the center-to-center shift between the patterned cells $56_{b3}$ and $56_{c3}$ in the down-track direction x. An offset of +360 degrees corresponds to a shift of a full patterned cell 56 in the down-track direction x.

Still referring to FIG. 8, the head 6 is offset by 10% TP in the cross-track direction z and 45 degrees in the down-track direction x. Accordingly, a readback signal is produced by the head 6 in response to the magnetization states of the patterned cells $56_{b2}$ and $56_{c2}$. As the head 6 moves in the down-track direction x it detects the readback signal associated with the patterned cells $56_{b3}$ and $56_{c3}$ in corresponding tracks b and c, and so forth. In the example illustrated in FIG. 8, given the predetermined dimensions of the head 6 and the predetermined cross-track and down-track offset positions of 10% TP and 45 degrees, the patterned cells $56_{a2}$ and $56_{a3}$ in track a are not detected. As subsequently described, the patterned cells 56 that are not detected by the head 6, such as those in track a, are labeled with an "*" and are treated as "don't care" bits until the head 6 is shifted in that direction.

Figure 9B:
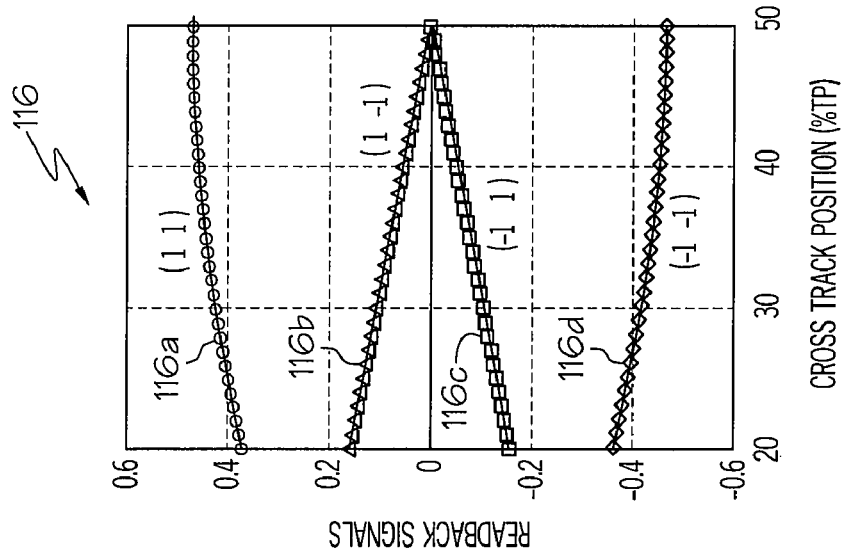
FIG. 9B is a plot of a readback signal produced by one embodiment of a head versus cross-track position for a down-track (timing phase) position of 45 degrees while the cross-track position is varied from 20 to 50% TP.
Figure 9A:
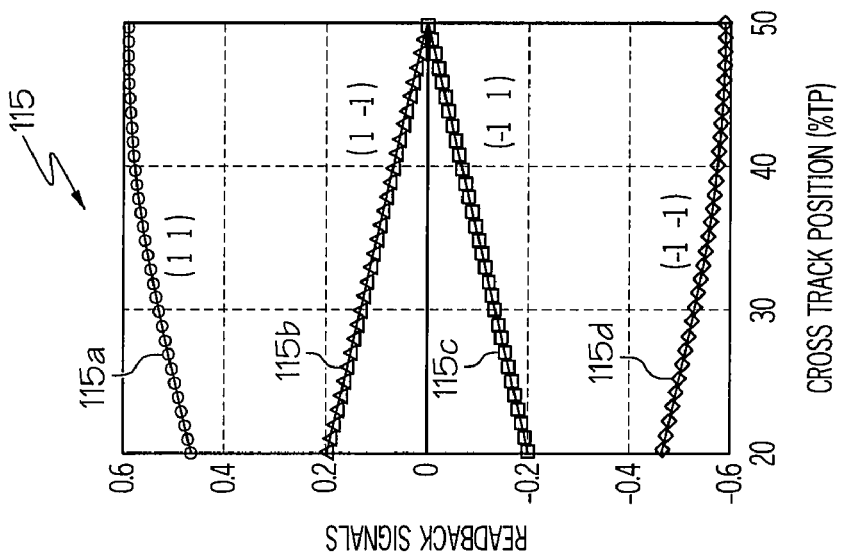
FIG. 9A is a plot of a readback signal produced by one embodiment of a head versus cross-track position for a down-track (timing phase) position of 0 degrees while the cross-track position is varied from 20 to 50% TP.

FIG. 9A is a plot 115 of a readback signal produced by the head 6 (FIGS. 1, 3, 5, 8) versus cross-track position for a down-track (timing phase) position 0 degrees while the cross-track position is varied from 20 to 50% TP. In other words, the head 6 is not offset in the down-track direction z and the cross-track position is varied from 20 to 50% TP. The readback signal produced by head 6 is therefore only a function of the cross-track position of the head 6 for four different states (1, 1), (1, −1), (−1, 1), and (−1, −1) of the patterned cells 56 (FIGS. 2, 3, 4, 8) corresponding to the head 6 traveling above tracks b and c as shown in FIG. 8. As shown in FIG. 9A, there are four distinct readback signal versus cross-track position curves 115a, 115b, 115c, and 115d for the corresponding four different states (1, 1), (1, −1), (−1, 1), and (−1, −1) of the patterned cells 56.

FIG. 9B is a plot 116 of the readback signal produced by the head 6 (FIGS. 1, 3, 5, 8) versus cross-track position for a down-track (timing phase) position of 45 degrees while the cross-track position is varied from 20 to 50% TP. In other words, the head 6 is offset 45 degrees in the down-track direction z and the cross-track position is varied from 20 to 50% TP. The readback signal produced by head 6 is therefore a function of the down-track as well as the cross-track position of the head 6 for four different states (1, 1), (1, −1), (−1, 1), and (−1, −1) of the patterned cells 56 (FIGS. 2, 3, 4, 8) corresponding to the head 6 traveling above tracks b and c. As shown in FIG. 9B, there are four distinct readback signal versus cross-track position curves 116a, 116b, 116c, and 116d for the corresponding four different states (1, 1), (1, −1), (−1, 1), and (−1, −1) of the patterned cells 56.

As shown in FIGS. 9A, 9B, for cross-track positions of the head 6 between 20 to 50% TP, there are four distinct readback signals produced by the head 6 corresponding to four different bit patterns produced by the patterned cells $56_{b2}$, $56_{b3}$, $56_{c2}$, and $56_{c3}$ along tracks (b, c) (FIG. 8) for each down-track offset position. For cross-track positions of the head 6 between 0 to 20% TP, however, there are eight distinct values, as the bit in track a ("*") (FIG. 8) begins to affect the readback signal. When the position of the head 6 remains in the down-track range of 0 to 45 degrees and the cross-track range of 20 to 50% TP, the detector circuit 19 (FIG. 1) and the detector circuit 19 (FIG. 1) demodulate the bits along the two tracks labeled (b, c). As previously discussed, the detector circuit 19 may be a stand alone circuit, may be formed integrally with the read/write circuit 16 (FIG. 1), or any other suitable circuits without limiting the described embodiments. As previously discussed, in various embodiments the detector circuit 19 may be a slicer or any single-track or multi-track data detection circuit (e.g., Viterbi, modified Viterbi, and the like) that is capable of providing the data bits to the processor circuit 20. The read/write circuit 16 receives the readback signal produced by head 6 as it passes over two or more patterned cells 56 (e.g., the patterned cells $56_{b2}$, $56_{b3}$ and $56_{c2}$, $56_{c3}$ along tracks b, c as shown in FIG. 8) at successive sampling times. The detector circuit 19 determines the bit values associated with the patterned cells 56 (e.g., the patterned cells $56_{b2}$, $56_{b3}$ and $56_{c2}$, $56_{c3}$ along tracks b, c as shown in FIG. 8) based on the readback signal and the cross-track/down-track contour plots associated with the readback signal according to the magnetic state of the patterned cells 56 at the successive sampling times. The readback signal and the contour plot information are demodulated by the detector circuit 19, which then outputs the bit patterns and positional information to the processor circuit 20 (FIG. 1). The detector circuit 19 also may demodulate the user data stored in patterned cells 56 and may output the user data to the interface circuit 18 (FIG. 1). It will be appreciated by those skilled in the art that the read/write circuit 16 also may perform this function. The interface circuit 18 buffers the user data in its internal memory. Based on the positional information associated with the head 6 supplied by the detector circuit 19 or the read/write circuit 16, the processor circuit 20 determines the timing at which the information was read by the head 6 corresponding to the read address. The interface circuit 18 outputs the user data read at the determined timing to the host computer from its buffer memory or the memory circuit 21.

FIGS. 10A, 10B, 10C, and 10D illustrate corresponding respective contour plots 120, 122, 124, 126 as functions of cross-track/down-track (timing phase) position of one embodiment of the head 6 (FIGS. 1, 3, 4, 5, 8) for four distinct bit patterns (1, 1), (1, −1), (−1, 1), and (−1, −1). The contour plots 120, 122, 124, 126 each have a plurality of contour lines for distinct values of cross-track position (% TP) and timing phase (degrees). As previously discussed with reference to FIGS. 9A, 9B, there are distinct readback signal versus cross-track position curves for the corresponding four different states (1, 1), (1, −1), (−1, 1), and (−1, −1) of the patterned cells 56 (FIGS. 2, 3, 4, 8) for a range of down-track (timing phase) positions, e.g., 0 to 45 degrees. Accordingly for a predetermined range of cross-track positions and down-track positions of the head 6, there exists a distinct set of readback signal versus cross-track position curves and a distinct set of contour lines. Therefore, the position of the head 6 may be determined by extracting this information based on distinct readback signals. In one embodiment, the position of the head 6 may be determined by finding the intersections of distinct contour lines for successive readback sampling times, as subsequently described with reference to FIGS. 11-13 and TABLE 1 below.

Figure 10A:
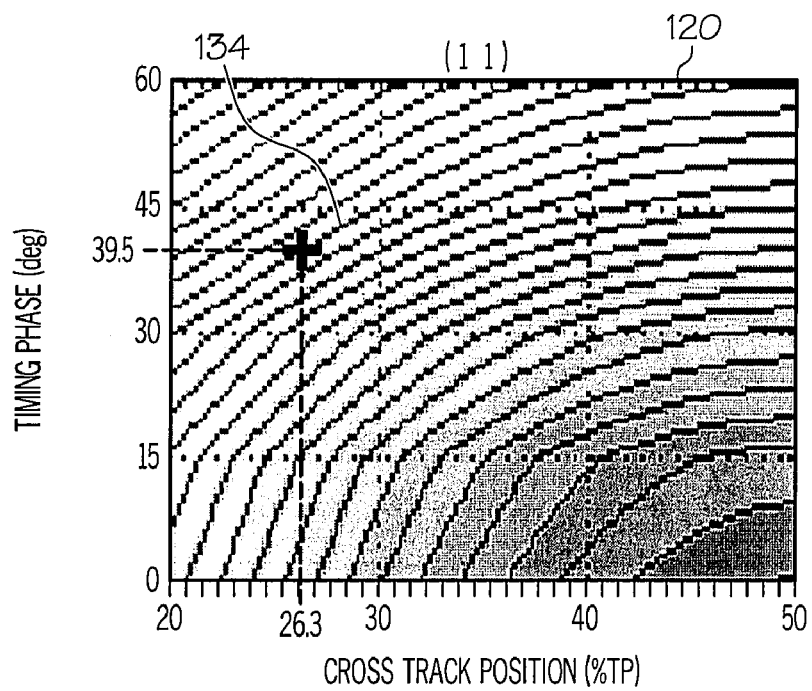

As an illustrative example, the contour plot 120 shown in FIG. 10A represents a family of contour lines as a function of the cross-track and down-track (timing phase) positions of the head 6 (FIG. 8) for a bit pattern of (1, 1). Based on FIGS. 9A and 9B, for down-track (timing phase) positions of the head 6 there exist distinct readback signal versus cross-track position curves 115a, 116a for the corresponding bit pattern (1, 1). Thus, when the head 6 travels over patterned cells 56 (FIG. 8), defining the bit pattern of (1, 1) located in adjacent tracks (b, c), the head 6 produces a distinct range of readback signals that can be associated with the bit pattern (1, 1) and the cross-track and down-track (timing phase) position of the head 6. In FIG. 10A, the contour line 134 at the point indicated by the + mark represents the readback signal produced by the head 6 positioned over two patterned cells 56 defining a bit pattern of (1, 1) located in adjacent tracks (b, c) when the head 6 has a cross-track offset of 26.3% TP and down-track (timing phase) offset of 39.5 degrees, which is within the predetermined cross-track position range of 20 to 50% TP and down-track (timing phase) position range of 0 to 45 degrees.

Figure 10B:
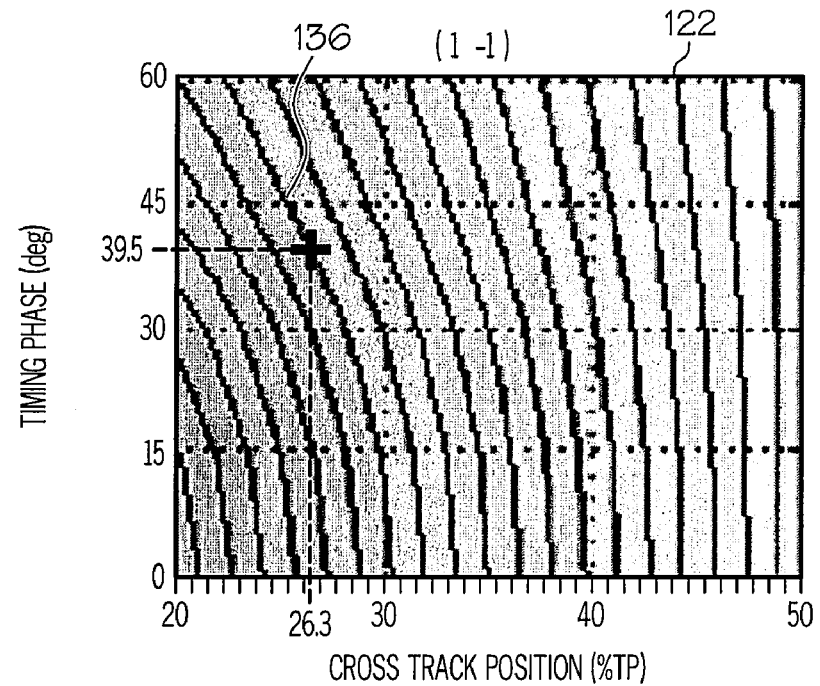

As a further illustrative example, the contour plot 124 shown in FIG. 10B represents a family of contour lines as a function of the cross-track and down-track (timing phase) positions of the head 6 (FIGS. 8) for a bit pattern of (−1, 1). Again, based on FIGS. 9A and 9B, for down-track (timing phase) positions of the head 6 there exist distinct readback signal versus cross-track position curves 115d, 116d for the corresponding bit pattern (−1, 1). Thus, when the head 6 travels over patterned cells 56 (FIG. 8) defining the bit pattern of (−1, 1) located in adjacent tracks (b, c), the head 6 produces a distinct range of readback signals that can be associated with the bit pattern (−1, 1) and the cross-track and down-track (timing phase) position of the head 6. In FIG. 10B, the contour line 136 at the point indicated by the + mark represents the readback signal produced by the head 6 positioned over two patterned cells 56 defining a bit pattern of (−1, 1) located in adjacent tracks (b, c) when the head 6 has a cross-track offset of 26.3% TP and down-track (timing phase) offset of 39.5 degrees, which is within the predetermined cross-track position range of 20 to 50% TP and down-track (timing phase) position range of 0 to 45 degrees.

As subsequently described in more detail with reference to FIGS. 11 and 12, the intersection of the contour lines 134 and 136 at the point indicated by the + mark represents the distinct cross-track offset of 26.3% TP and down-track (timing phase) offset of 39.5 degrees of the head 6 when the head 6 travels over the bit pattern (1, 1) at a first sampling time and then travels over the bit pattern (−1, 1) at a successive sampling time. Therefore, the detector circuit 19 (FIG. 1) and the processor circuit 20 (FIG. 1) can determine the bit patterns at each sampling time and the location of the head 6.

Figure 10C:
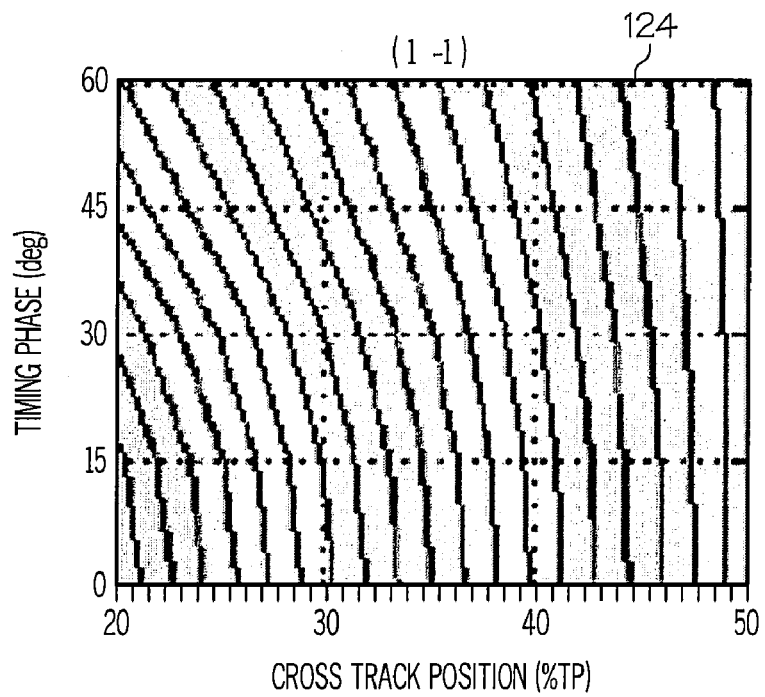

As another illustrative example, the contour plot 122 shown in FIG. 10C represents a family of contour lines as a function of the cross-track and down-track (timing phase) positions of the head 6 (FIG. 8) for a bit pattern of (1, −1). This contour plot 122 would be employed when the head 6 produces a readback signal that corresponds to a bit pattern of (1, −1) defined by the patterned cells 56 (FIG. 8) located in adjacent tracks (b, c).

Figure 10D:
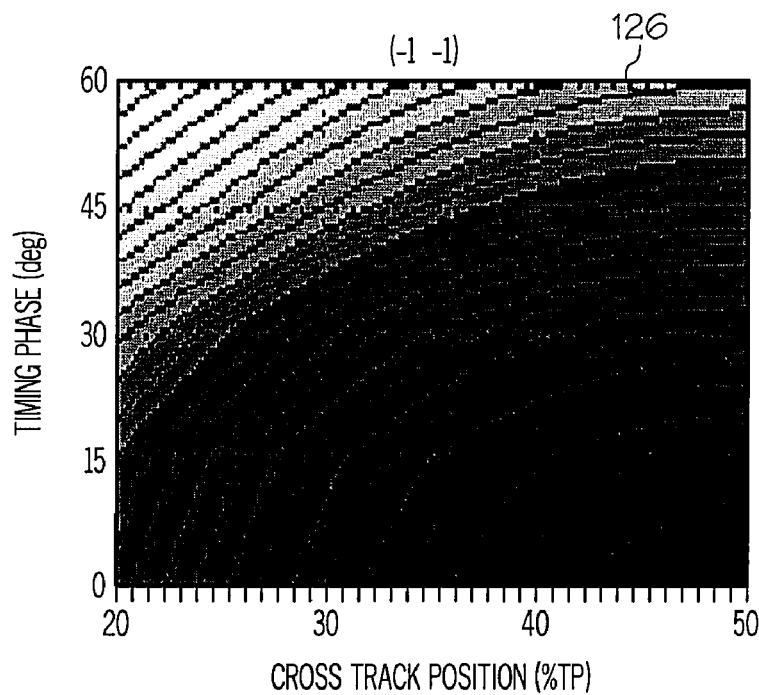

As a further illustrative example, the contour plot 126 shown in FIG. 10D represents a family of contour lines as a function of the cross-track and down-track (timing phase) positions of the head 6 (FIG. 8) for a bit pattern of (−1, −1). This contour plot 126 would be employed when the head 6 produces a readback signal that corresponds to a bit pattern of (−11, −1) defined by the patterned cells 56 (FIG. 8) located in adjacent tracks (b, c).

In one embodiment, the contour plots shown in FIGS. 10A-D may be digitized and stored in a look-up table to be accessed by a suitable circuit such as the detector circuit 19 and/or the processor circuit 20 (FIG. 1). In other embodiments, equations or functions representative of the contour plots shown in FIGS. 10A-D may be implemented by the detector circuit 19 and/or the processor circuit 20 in the form of executable instructions.

The demodulation algorithm will now be described with reference to FIGS. 11 and 12 in addition to FIGS. 9A,B and 10A,B, previously described. FIG. 11 illustrates the relationship between bit patterns defined by the patterned cells 56 and the location of the head 6 at successive sampling times T1 and T2. At sampling time T1, the cross-track position of the head 6 is approximately 25% TP and the down-track position of the head 6 (timing phase) is approximately 45 degrees, which is within a predetermined range that can produce distinct readback signals from which the bit patterns and the position of the head 6 can be determined. For convenience and clarity, the position of the head 6 at T1 is referred to as the first position. Also, for convenience and clarity, the shaded patterned cells $56_{a1}$, $56_{a2}$, and $56_{b2}$ are −1. At sampling time T1, the patterned cell $56_{b1}$ in track b is +1 and the patterned cell $56_{c1}$ in track c is also +1. Thus, when the head 6 is in the first position at sampling time T1 the patterned cells $56_{b1}$, $56_{c1}$ in respective tracks (b, c) define the bit pattern (1, 1) and the head 6 produces a first readback signal 0.42 as shown in FIG. 12. As previously discussed, the head 6 offset in the cross-track and down-track (timing phase) directions produces a readback signal that is a function of the magnetization of both patterned cells $56_{b1}$ and $56_{c1}$ and can be derived based on distinct surface sensitivity plots of potential distribution versus down-track and cross-track distances for a given head, as shown in FIGS. 6 and 7, for example. As the patterned medium 2 rotates, the head 6 is located in a second down-track position (shown in broken line) at sampling time T2. As shown in FIG. 11, at sampling time T2, the head 6 is positioned over down-track patterned cells $56_{b2}$, $56_{c2}$. At sampling time T2, the cross-track position of the head 6 is also approximately 25% TP and the down-track position of the head 6 (timing phase) is also approximately 45 degrees, and thus is within the predetermined range. At sampling time T2 the patterned cells $56_{b2}$, $56_{c2}$ in respective tracks (b, c) define the bit pattern (−1, 1) and the head 6 produces a second readback signal −0.13 as shown in FIG. 12.

The readback signals 0.42 and −0.13 produced by the head 6 at respective sampling times T1 and T2 can be correlated with the respective contour plots 120, 122 (FIGS. 10A, 10B), which provide possible cross-track position/down-track position (timing phase) combinations for these distinct readback values (0.42, −0.13). Accordingly, the distinct readback values (0.42, −0.13) as read by the head 6 and processed by the read/write circuit 16 and/or the detector circuit 19 in conjunction with the processor circuit 20 can be used to select distinct bit patterns at sampling times T1 and T2 using the information provided in the plots 115, 116 shown in FIGS. 9A-B. For example, the plots 115, 116 indicate that only the distinct bit pattern (1, 1) will produce a readback signal of 0.42, which is within a range of readback values indicated by curves 115a, 116a. Similarly, the plots 115, 116 indicate that only the distinct bit pattern (−1, 1) will produce a readback signal of −0.13, which is within a range of readback values indicated by curves 115c, 116c. Once the distinct bit patterns are determined by the detector circuit 19, for example, the contour lines from the contour plots shown in FIGS. 10A-B, which are associated with the distinct bit patterns (1, 1) and (−1, 1), are selected to determine the positional information of the head 6 as discussed with reference to FIG. 12. This additional processing function may be implemented by the processor circuit 20.

FIG. 12 illustrates the intersection of contour lines corresponding to the position of one embodiment of the head 6 at successive sampling times T1 and T2, as shown in FIG. 11, which can be used to determine the relative cross-track/down-track (timing phase) position of the head 6 based on the distinct bit patterns produced by the detector circuit 19. At sampling time T1, it was previously determined that a readback signal of 0.42 could be produced by the patterned cells $56_{b1}$, $56_{c1}$ for the distinct bit pattern (1, 1). The contour plot 120 in FIG. 10A corresponds to the bit pattern (1, 1). Similarly, at sampling time T2, it was previously determined that a readback signal of −0.13 could be produced by the patterned cells $56_{b2}$, $56_{c2}$ for the distinct bit pattern (−1, 1). The contour plot 122 in FIG. 10B corresponds to the bit pattern (−1, 1). The distinct bit patterns and position of the head 6 at successive sampling times T1 and T2 may be determined by taking the intersection of contour lines 134, 136, which provides the distinct cross-track position of the head 6 as 26.3% TP and the down-track (timing phase) position of the head 6 as 39.5 degrees. These values may be determined as the head 6 travels over bit pattern (1, 1) at the first sampling time T1 and bit pattern (−1, 1) at a successive sampling time T2.

In one embodiment, the detector circuit 19 (FIG. 1) provides data bits that correspond to the readback signal as the head 6 travels over predetermined bit patterns at successive time intervals. Once the bit patterns are determined, the detector circuit 19 provides the bit patterns to the processor circuit 20 to simultaneously determine the cross-track and down-track position of the head 6 (FIG. 11). In various embodiments, the detector circuit 19, the read/write circuit 16, and/or the processor circuit 20 may perform some or all of the demodulation processes.

With reference now to FIGS. 10A, 10B, 11, and 12, in one embodiment, the detector circuit 19 determines the readback signal produced by the head 6 at successive sampling times T1, T2 outputs the corresponding bit patterns to the processor circuit 20. As the head 6 passes over the patterned cells $56_{b1}$, $56_{c1}$ at the sampling time T1, the read/write circuit 16 receives a readback signal value of 0.42 from the head 6. As the head 6 passes over the patterned cells $56_{b2}$, $56_{c2}$ at the successive sampling time T2, the read/write circuit 16 receives a readback signal value of −0.13. The readback signals are provided to the detector circuit 19, which determines the corresponding bit patterns. Based on the readback signal values (0.42, −0.13), assuming that the head 6 is within the nominal cross-track offset of 20 to 50% TP and the down-track (timing phase) offset of 0 to 45 degrees, the detector circuit 19 determines the distinct bit patterns at each sampling time T1, e.g., (1, 1), and T2, e.g., (−1, 1). Once the distinct bit patterns are determined, the detector circuit 19 provides the bit patterns to the processor circuit 20 (FIG. 1), which executes programmed instructions to perform either a look-up or to calculate the contour plots associated with the distinct bit patterns. In this example, as illustrated in FIGS. 10A, 10B, the contour plots 120, 122 are associated with the respective bit patterns (1, 1), (−1, 1). The detector circuit 19 and/or the processor circuit 20 may execute programmed instructions to select the distinct contour lines 134, 136 of respective contour plots 120, 122 based on the nominal offset cross-track/down-track (timing phase) position of the head 6. The detector circuit 19 and/or the processor circuit 20 may execute programmed instructions to determine the intersection of these contour lines 134, 136 in order to determine the actual cross-track/down-track (timing phase) position of the head 6 of 26.3% TP, 39.5 degrees, which is shown in FIG. 12 and corresponds to the + marks in FIGS. 10A, 10B.

Figure 13A:
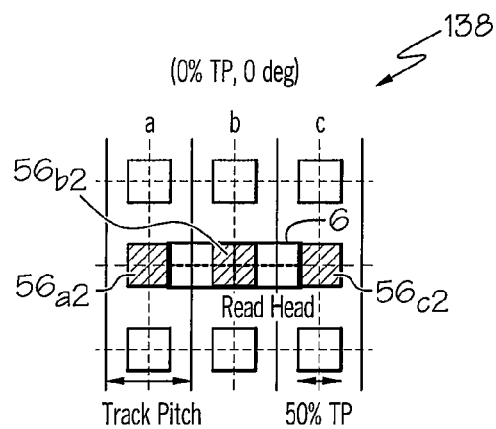
Figure 13B:
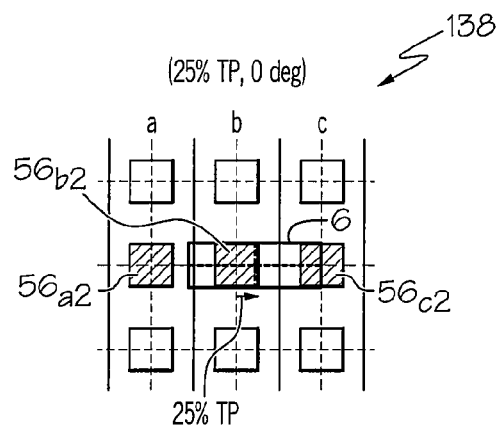
Figure 13C:
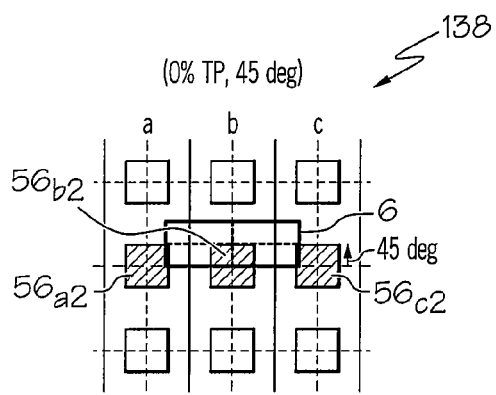
Figure 13D:
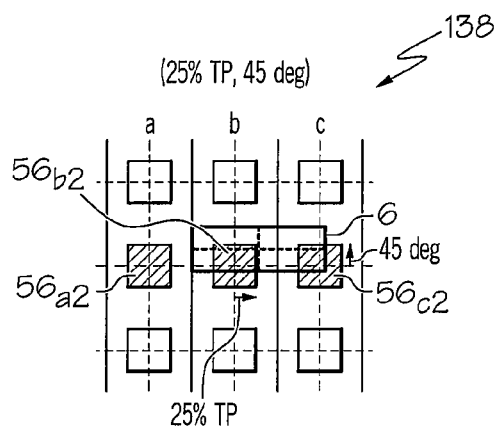

FIGS. 13A, 13B, 13C, 13D illustrate an array of patterned cells at several cross-track/down-track (timing phase) positions for one embodiment of the head 6. As illustrated in FIGS. 13A-D, the patterned cell array 138 is substantially square, which means that the cross-track spacing and the down-track spacing between the patterned cells 56 are substantially the same. As shown in FIG. 13A, the head 6 is centered on the middle patterned cell $56_{b2}$ with no cross-track/down-track (timing phase) offset. As shown, the cross-track position of the head 6 is 0% TP and the down-track (timing phase) position of the head 6 is 0 degrees. In this configuration, the head 6 spans approximately all three tracks (a, b, c), but is dimensioned to cover only the patterned cells $56_b$ in the middle track b. In FIG. 13B, the cross-track position of the head 6 is 25% TP and the down-track (timing phase) position of the head 6 is 0 degrees. In this configuration, the head 6 spans two of the tracks (b, c) only and covers the patterned cells $56_{b2}$ and $56_{c2}$. In FIG. 13C, the cross-track position of the head 6 is 0% TP and the down-track (timing phase) position of the head 6 is 45 degrees. In this configuration, the head 6 also spans all three tracks (a, b, c) because there is no cross-track offset, but only covers the patterned cell $56_{b2}$. In FIG. 13D, the cross-track position of the head 6 is 25% TP and the down-track (timing phase) position of the head 6 is 45 degrees. In this configuration, the head 6 spans two of the tracks (b, c) only and covers the patterned cells $56_{b2}$, $56_{c2}$. The readback signals and distinct bit patterns associated with the patterned cell array 138 shown in FIGS. 13A-D is shown in TABLE 1.

TABLE 1 below shows the readback signals produced by the head 6 for four possible cross-track/down-track (timing phase) positions of the head 6 shown in FIGS. 13A-D and eight distinct combinations of bit patterns (a, b, c) associated therewith.

TABLE 1

| Bit Pattern | | | Readback signals [Position 1% TP], Timing Phase [degree] | | | |
|---|---|---|---|---|---|---|
| a | b | c | (0% TP, 0 deg) | (25% TP, 0 deg) | (0% TP, 45 deg) | (25% TP, 45 deg) |
| 1 | 1 | 1 | 0.41 | 0.50 | 0.32 | 0.39 |
| −1 | 1 | 1 | 0.36 | 0.50 | 0.27 | 0.39 |
| 1 | 1 | −1 | 0.36 | 0.17 | 0.27 | 0.13 |
| −1 | 1 | −1 | 0.25 | 0.17 | 0.20 | 0.13 |
| 1 | −1 | 1 | −0.25 | −0.17 | −0.20 | −0.13 |
| −1 | −1 | 1 | −0.36 | −0.17 | −0.27 | −0.13 |
| 1 | −1 | −1 | −0.36 | −0.50 | −0.27 | −0.39 |
| −1 | −1 | −1 | −0.41 | −0.50 | −0.32 | −0.39 |

FIG. 14A is a plot 137 of readback signals produced by one embodiment of the head 6 (FIGS. 13A-D) versus cross-track position for a down-track (timing phase) position of 0 degrees for the eight distinct combinations of bits shown in TABLE 1. As shown in FIG. 14A and TABLE 1, there are eight distinct readback signal versus cross-track position curves for the corresponding four different states of the patterned cells 56, e.g., (1, 1, 1), (−1, 1, 1), (1, 1, −1), (−1, 1, −1), (1, −1, 1), (−1, −1, 1), (1, −1, −1), and (−1, −1, −1).

FIG. 14B is a plot 139 of readback signals produced by one embodiment of the head 6 (FIGS. 13A-D) versus cross-track position for a timing phase (down-track position) of 45 degrees for the eight distinct combinations of bits shown in TABLE 1. As shown in FIG. 14A and TABLE 1, there are eight distinct readback signal versus cross-track position curves for the corresponding four different states of the patterned cells 56, e.g., (1, 1, 1), (−1, 1, 1), (1, 1, −1), (−1, 1, −1), (1, −1, 1), (−1, −1, 1), (1, −1, −1), and (−1, −1, −1).

As illustrated in FIGS. 14A, 14B, for the nominal offset range position of the head 6, i.e., 20 to 50% TP, there are four distinct bit patterns in tracks (b, c). Therefore, as previously discussed, once the detector circuit 19 (FIG. 1) determined the distinct bit patterns in tracks (b, c) based on the readback signals, the processor circuit 20 (FIG. 1) can execute programmed instructions to determine the cross-track and down-track positions of the head 6, provided that the position of the head 6 remains within the 20-50% TP offset range. For head positions between 0 and 20%, there are eight distinct bit patterns because the bit in track a begins to affect the readback signal produced by the head 6. Accordingly, a different algorithm may be employed to demodulate the patterned bits in all three tracks (a, b, c).

FIGS. 15A-H illustrate contour plots corresponding to eight distinct readback signals produced by one embodiment of the head 6 (FIGS. 13A-D) for eight bit patterns located in adjacent tracks (a, b, c) as functions of the cross-track/down-track (timing phase) position of the head 6. As previously discussed, once the distinct bit patterns have been determined by the detector circuit 19 (FIG. 1) for a given set of readback signals sampled at successive sampling times, the corresponding contour information may be employed to determine the cross-track position and the down-track (timing phase) position of the head 6 by finding the intersection of the relevant contour lines. In one embodiment, the contour plots shown in FIGS. 15A-H may be digitized and stored in a look-up table to be accessed by a suitable circuit such as the detector circuit 19 (FIG. 1) and/or the processor circuit 20 (FIG. 1). In other embodiments, either the detector circuit 19 and/or the processor circuit 20 may be programmed to solve the equations or functions representative of these contour plots.

For the example that follows, the nominal offset position of the head 6 (FIG. 16) is 20 to 50% TP cross-track position and 0 to 45 degrees down-track (timing phase) position. Contour line 142 at the point indicated on contour plot 140 by the + mark in FIG. 15A represents the readback signal produced by the head 6 for the bit pattern (1, 1, 1). Similarly, contour line 146 at the point indicated on contour plot 144 by the + mark in FIG. 15B represents the readback signal produced by the head 6 for the bit pattern (1, −1, 1). Contour line 142 at the point indicated on contour plot 140 by the + mark in FIG. 15A represents the readback signal produced by the head 6 for the bit pattern (1, 1, 1). Contour line 142 at the point indicated on contour plot 140 by the + mark in FIG. 15A represents the readback signal produced by the head 6 for the bit pattern (1, 1, 1).

FIG. 16 illustrates a relationship between bit patterns and the location of one embodiment of the head 6 at successive sampling times T1 and T2. For convenience and clarity, the shaded patterned cells $56_{a1}$, $56_{a2}$, $56_{b2}$, $56_{c3}$ are −1. At sampling time T1, the head 6 is positioned partially above the patterned cells $56_{b1}$, $56_{c1}$ in tracks b and c. It is assumed that the head 6 is positioned within the cross-track range of 20 to 50% TP and the down-track (timing phase) range of 0 to 45 degrees. Thus, at sampling time T1, the cross-track position of the head 6 is assumed to be approximately 25% TP and the down-track (timing phase) position of the head 6 is approximately 45 degrees. For convenience, the position of the head 6 at T1 is referred to as the first position. At sampling time T1, the patterned cell $56_{b1}$ in track b is +1 and the patterned cell $56_{c1}$ in track c is also +1. Accordingly, the combination of the patterned cells $56_{b1}$, $56_{c1}$ in tracks (b, c) at T1 is even because the resulting bits in the bit pattern (*, 1, 1,) have the same sign positive +1, where the "*" represents a "don't care" bit. Thus at sampling time T1 the patterned cells $56_{b1}$, $56_{c1}$ in respective tracks (b, c) define a bit pattern of (*, 1, 1), where "*" represents a "don't care" bit and the head 6 produces a first readback signal value 0.40 as shown in FIG. 17.

As the patterned medium 2 (FIGS. 1, 2) rotates, at sampling time T2, the head 6 is located in a second position down-track (shown in broken line). At sampling time T2, the head 6 is positioned partially above the patterned cells $56_{b2}$, $56_{c2}$ in tracks b and c. Again, it is assumed that the head 6 is positioned within the cross-track range of 20 to 50% TP and the down-track (timing phase) range of 0 to 45 degrees. As shown in FIG. 17, at sampling time T2, the head 6 is positioned partially over down-track patterned cells $56_{b2}$, $56_{c2}$. At sampling time T2, the cross-track position of the head 6 is also approximately 25% TP and the down-track position of the head 6 (timing phase) is also approximately 45 degrees. At T2, the patterned cell $56_{b2}$ in track b is −1 and the patterned cell $56_{c2}$ in track c is +1. Accordingly, the combination of the patterned cells $56_{b2}$, $56_{c2}$ in tracks (b, c) at T2 is odd because the resulting bits in the bit pattern (*, −1, 1,) have the opposite sign. Thus at sampling time T2 the patterned cells $56_{b2}$, $56_{c2}$ in respective tracks (b, c) define a bit pattern of (*, −1, 1), where "*" represents a "don't care" bit and the head 6 produces a second readback signal value of −0.15 as shown in FIG. 17. These readback signal values of 0.40 and −0.15 produced by the head 6 at respective successive sampling times T1 and T2 can be correlated with the plots 137, 139 in respective FIGS. 14A, 14B to determine the corresponding distinct bit patterns that can produce the readback signal values (0.40, −0.15) based on the distinct readback signal versus cross-track position curves. Once the distinct bit patterns are identified, the corresponding contour plots in FIGS. 15A-H are identified to determine the positional information of the head 6.

It will be appreciated by those skilled in the art that the odd combination of patterned bits and the even combination of patterned bits need not occur successively in the down-track direction. With the assumption that the timing phase and the cross-track position do not change significantly over several samples, the position/phase demodulation algorithm need only keep the information from an even (odd) bit combination sample in the memory circuit 21 (FIG. 1) until an odd (even) bit combination sample is encountered.

FIG. 17 illustrates the intersection of contour lines corresponding to the position of one embodiment of the head 6 at successive sampling times T1 and T2, as shown in FIG. 16, for determining the bit patterns and the relative cross-track/down-track (timing phase) position of the head 6 based on distinct bit patterns. As shown in FIGS. 14A and 14B, there are four distinct readback signal versus cross-track position curves capable of producing the readback signal values (0.40, −0.15): (1, 1, 1), (−1, 1, 1), (1, −1, 1), and (−1, −1, 1). These unique bit patterns (1, 1, 1), (−1, 1, 1), (1, −1, 1), and (−1, −1, 1) correspond to the contour plots 140, 141, 144, 145 in respective FIGS. 15A-D. However, in the cross-track range of 20 to 50% TP, the contour lines pairs 142/143 (FIGS. 15A, 15C) and 146/147 (FIGS. 15B, 15D) are substantially identical. Therefore, the intersection of these pairs of contours lines 142/143 and 146/147 determines the unique cross-track position of the head 6 of 24% and the down-track (timing phase) position of the head 6 of 42 degrees.

As previously discussed with reference to FIGS. 10-12, in one embodiment, the detector circuit 19 (FIG. 1) demodulates the readback signals produced by the head 6 to determine the bit patterns and the processor circuit 20 determines the cross-track position and the down-track position of the head 6 based on the unique bit patterns provided by the detector circuit 19. In various embodiments, the detector circuit 19, the read/write circuit 16, and/or the processor circuit 20 may be configured to perform some or all of the demodulation processes.

With reference now to FIGS. 13-17, first, the read/write circuit 16 (FIG. 1) determines the readback signal produced by the head 6 at successive sampling times T1, T2. As the head 6 passes over the patterned cells $56_{b1}$, $56_{c1}$ at sampling time T1, the read/write circuit 16 receives a readback signal value of 0.40. As the head 6 passes over the patterned cells $56_{b2}$, $56_{c2}$ at successive sampling time T2, the read/write circuit 16 receives a readback signal value of −0.15. The readback signals are detected by the detector circuit 19 and the unique bit patterns are provided to the processor circuit 20 (FIG. 1) for demodulation. Based on these readback signal values of (0.40, −0.15), assuming that the head 6 is within the nominal cross-track offset of 20 to 50% TP and the down-track (timing phase) offset of 0 to 45 degrees, the detector circuit 19 (FIG. 1) and/or the processor circuit 20 execute programmed instructions to determine the possible distinct bit patterns at sampling time T1, e.g., (1, 1, 1) or (−1, 1, 1), and the possible distinct bit patterns at sampling time T2, e.g., (1, −1, 1) or (−1, −1, 1) that can produce the corresponding readback signals. Once the possible distinct bit patterns are determined, the detector circuit 19 and/or the processor circuit 20 execute programmed instructions to either perform a look-up or calculate the contour plots associated with the distinct bit patterns.

In the example illustrated in FIGS. 14A-B and 15A-D, the resulting contour lines 142 and 143 are substantially identical for the cross-track position range of 20 to 50% TP. Similarly, the resulting contour lines 146 and 147 are substantially identical for the cross-track position range of 20-50% TP. Therefore, the detector circuit 19 (FIG. 1) and/or the processor circuit 20 (FIG. 1) execute programmed instructions to select the distinct contour line pairs 142/143 and 146/147 of respective contour plots 140, 141, 144, 145 and determine the intersection of the selected contour line pairs 142/143 and 146/147. This information may be employed to determine the actual cross-track/down-track (timing phase) position of the head 6 of 24% TP, 42 degrees, which is shown in FIG. 17 and corresponds to the + marks shown in FIGS. 15A-D.

It will be appreciated that the demodulation of patterned bits along tracks (b, c) is one example of multilevel recording. Those skilled in the art will appreciate that the detector circuit 19 (FIG. 1) and/or the processor circuit 20 can be configured to distinguish between four different readback signal levels corresponding to four different bit combinations without limitation.

FIG. 18 illustrates one embodiment of the read head 6 orientation relative to the cross-track/down-track (timing phase) position in an array 150 of patterned cells 56. Although this particular configuration has been previously discussed, it is shown in FIG. 18 to facilitate comparison with the configurations illustrated in FIGS. 19 and 20. In FIG. 18, the head 6 is shown at a first sampling time T1 and a successive sampling time T2 (shown in broken line) as the patterned medium 2 rotates in the down-track direction indicated by arrow x. The array 150 is formed such that the distance between the patterned cells 56 is substantially the same between adjacent tracks in the cross-track direction as well as the down-track direction and may be referred to as a square array. The track pitch (TP) between adjacent tracks is substantially perpendicular to the down-track direction indicated by x. The orientation of the head 6 is substantially similar to the orientation of the head 6 previously discussed and is shown straddling more than one adjacent track substantially perpendicular to the down-track direction x.

FIG. 19 illustrates one embodiment of the read head 6 orientation relative to the cross-track/down-track (timing phase) position in an array 152 of patterned cells 56. The head 6 is shown at a first sampling time T1 and a successive sampling time T2 (shown in broken line) as the patterned medium 2 rotates in the down-track direction indicated by arrow x. One difference between the array 150 shown in FIG. 18 and the array 152 is that the array 152 formed such that the patterned cells 56 in adjacent tracks are offset in the down-track direction x relative to each other. Accordingly, the patterned cells 56 in adjacent tracks form an angle θ relative to the cross-track direction indicated by arrow z, or stated another way, the patterned cells 56 form an angle of (90-θ) relative to the down-track direction x. In various embodiments, the angle θ is anywhere between 0 and 45 degrees, although other angles may be selected without limitation. The patterned cells 56 in every other track are aligned such that the relative angle between the magnetic cells is substantially 0 degrees. Therefore, the track pitch (TP') between patterned cells 56 in adjacent tracks is aligned at angle θ relative to direction z. The head 6 is oriented substantially along the down-track direction x.

FIG. 20 illustrates one embodiment of the read head 6 orientation relative to the cross-track/down-track (timing phase) position in the array 152 of patterned cells 56. The head 6 is shown at a first sampling time T1 and a successive sampling time T2 (shown in broken line) as the patterned medium 2 rotates in the down-track direction indicated by arrow x. As previously discussed in FIG. 19, the array 152 is formed such that the patterned cells 56 in adjacent tracks are offset in the down-track direction x relative to each other. Accordingly, the patterned cells 56 in adjacent tracks form an angle θ relative to the cross-track direction indicated by arrow z, or stated another way, the magnetic cells form an angle of (90-θ) relative to the down-track direction x. In various embodiments, the angle θ is anywhere between 0 and 45 degrees, although other angles may be selected without limitation. The patterned cells 56 in every other track are aligned such that the relative angle between the magnetic cells is substantially 0 degrees. Therefore, the track pitch (TP') between patterned cells 56 in adjacent tracks is aligned at angle θ relative to direction z. The head 6 is oriented at the same angle θ relative to the cross-track direction z. It will be appreciated that the head 6 may be oriented at other angles relative to the cross-track direction z without limitation.

FIG. 21 illustrates one embodiment of a method 160 in accordance with the above described embodiments. With reference now to FIGS. 1-21, and particularly to the bit patterns defined by the patterned cells $56_{b1}$, $56_{c1}$, $56_{b2}$, $56_{c2}$ and the location of the head 6 at successive sampling times T1 and T2 as shown in FIG. 11, in one embodiment, the head 6 configured to respond to the magnetization state of patterned cells 56 detects 162 a magnetization state of at least two patterned cells $56_{b1}$, $56_{c1}$ formed on the patterned medium 2. A readback signal is generated 164 by the head 6 in response to the magnetization state of the at least two patterned cells $56_{b1}$, $56_{c1}$. The readback signal is amplified by the head amplifier 12 and is passed to the read/write circuit 16 and the detector circuit 19. The detector circuit 19 detects unique bit patterns associated with the readback signal and provides the unique bit patterns to the processor circuit 20. The detector circuit 19 is configured to determine 166 the unique bit patterns based on the readback signal received from the head 6 and/or the read/write circuit 16. The processor circuit 20 receives the unique bit patterns from the detector circuit 19 and is configured to execute programmed instructions to determine positional information associated with the head 6 relative to the at least two patterned cells $56_{b1}$, $56_{c1}$ based on the unique bit patterns provided by the detector circuit 19.

In one embodiment, the drive circuit 14 positions the head 6 with an offset in the cross-track direction x relative to the patterned cells $56_{b1}$, $56_{c1}$ across at least two tracks (b, c) formed on the patterned medium 2. The at least two patterned cells $56_{b1}$, $56_{c1}$ are located within the at least two tracks (b, c). The head 6 partially covers at least one of the at least two patterned cells $56_{b1}$, $56_{c1}$.

In one embodiment, the drive circuit 14 positions the head 6 over at least two tracks (b, c) formed on the patterned medium 2 to locate the head 6 at an offset in the down-track direction z relative to the patterned cells $56_{b1}$, $56_{c1}$ along at least two tracks (b, c) formed on the patterned medium 2. The at least two patterned cells $56_{b1}$, $56_{c1}$ are located within the at least two tracks (b, c). The head 6 partially covers at least one of the at least two patterned cells $56_{b1}$, $56_{c1}$.

In one embodiment, the head 6 responds to the magnetization state of at least first and second patterned cells $56_{b1}$, $56_{c1}$ formed on the patterned medium 2 at a first sampling time (T1). The head 6 generates a first readback signal in response to the magnetization state of the at least first and second patterned cells $56_{b1}$, $56_{c1}$ at T1. The head 6 then responds to the magnetization state of the at least third and fourth patterned cells $56_{b2}$, $56_{c2}$ formed on the patterned medium 2 at a second sampling time (T2). The head 6 generates a second readback signal based on the magnetization state of the at least third and fourth patterned cells $56_{b2}$, $56_{c2}$ at T2. The readback signal is amplified by the head amplifier 12 and is passed to the read/write circuit 16 and the detector circuit 19. The detector circuit 19 determines unique bit patterns associated with the first and second readback signals and provides the unique bit patterns to the detector circuit 19. The detector circuit 19 and/or the processor circuit 20 may be configured to execute programmed instructions to determine at least a first position/timing phase contour data corresponding to the first readback signal that is associated with the first bit pattern. The detector circuit 19 and/or the processor circuit 20 may b configured to execute programmed instructions to determine at least a second position/timing phase contour corresponding to the second readback signal that is associated with the second bit pattern. Either the detector circuit 19 or the processor circuit 20 may be configured to execute programmed instructions to determine the intersection between the first position/timing phase contour plot and the second position/timing phase contour plot. The processor circuit 20 determines the positional information associated with the head 6 based on the intersection of the first and second position/timing phase contour plots.

In one embodiment, the first position/timing phase contour data may be retrieved either by the detector circuit 19 or the processor circuit 20 from a first memory location in the memory circuit 21. Similarly, the second position/timing phase contour data may be retrieved from a second memory location in the memory circuit 21.

In one embodiment, the processor circuit 20 calculates the first position/timing phase contour data based on a surface sensitivity potential distribution 114 of the head 6. Similarly, the second position/timing phase contour data may be calculated based the surface sensitivity potential distribution 114 of the head 6.

In one embodiment, the drive circuit 14 positions the head 6 with an offset in a down-track direction x relative to the patterned cells $56_{b1}$, $56_{b2}$ along at least one of the tracks (a, b, c) formed on the patterned medium 2. The at least two patterned cells $56_{b1}$, $56_{b2}$ are located within at least one of the tracks (a, b, c). The head 6 partially covers at least one of the at least two patterned cells $56_{b1}$, $56_{b2}$.

In various embodiments, the drive circuit 14 positions the head 6 over at least one patterned cell 56. In one embodiment, the drive circuit 14 positions the head 6 over at least one patterned cell 56 in a first track (a) that is shifted in a down-track direction z relative to at least one patterned cell 56 in a second track (b). In another embodiment, the drive circuit 14 positions the head 6 with an offset at an angle θ to a cross-track direction x relative to the patterned cells $56_{b1}$, $56_{c2}$ along at least two of the tracks (b, c) formed on the patterned medium 2. The at least two patterned cells $56_{b1}$, $56_{c2}$ are located within at least two of the tracks (b, c). The head 6 partially covers at least one of the at least two patterned cells $56_{b1}$, $56_{c2}$. In yet another embodiment, the drive circuit 14 positions the head 6 over at least one patterned cell 56 in a first track (a) that is shifted in a down-track direction z relative to at least one patterned cell 56 in a second track (b).

Although the various embodiments of the devices have been described herein in connection with certain disclosed embodiments, many modifications and variations to the described embodiments may be implemented. For example, different types of circuits may be employed. The foregoing description and following claims are intended to cover all such modification and variations.

The invention claimed is:

1. A method, comprising:
    detecting, with a magnetoresistive head configured to respond to magnetization states of patterned cells formed on a patterned medium, a magnetization state of at least two patterned cells formed on the patterned medium, the at least two patterned cells corresponding to a user data bit pattern;
    generating a readback signal with the magnetoresistive head based on the magnetization state of the at least two patterned cells;
    determining, with a detector circuit coupled to the magnetoresistive head, the user data bit pattern associated with the readback signal; and
    determining, with a processor circuit coupled to the detector circuit, positional information associated with the head relative to the at least two patterned cells based on the user data bit pattern.

2. The method of claim 1, comprising:
    positioning the magnetoresistive head over at least two tracks formed on the patterned medium with a drive circuit coupled to the processor circuit, wherein positioning the magnetoresistive head comprises positioning the magnetoresistive head at an offset in a cross-track direction relative to the patterned cells across the at least two tracks formed on the patterned medium, wherein the at least two patterned cells are located within the at least two tracks, and wherein the head partially covers at least one of the at least two patterned cells.

3. The method of claim 1, comprising:
    positioning the magnetoresistive head over at least two tracks formed on the patterned medium with a drive circuit coupled to the processor, wherein positioning the magnetoresistive head comprises positioning the magnetoresistive head at an offset in a down-track direction relative to the patterned cells along at least two tracks formed on the patterned medium, wherein the at least two patterned cells are located within the at least two tracks, and wherein the head partially covers at least one of the at least two patterned cells.

4. The method of claim 1, comprising:
    positioning the head over at least two tracks formed on the patterned medium with a drive circuit coupled to the processor, wherein positioning the magnetoresistive head comprises positioning the magnetoresistive head at an offset in a down-track direction relative to the patterned cells along at least one track formed on the patterned medium, wherein the at least two patterned cells are located within the at least one tracks, and wherein the head partially covers at least one of the at least two patterned cells.

5. The method of claim 4, comprising:
    positioning the head with the drive circuit, wherein positioning the magnetoresistive head comprises positioning the magnetoresistive head over at least one patterned cell in a first track that is shifted in a down-track direction relative to at least one patterned cell in a second track.

6. The method of claim 1, comprising:
    positioning the head with a drive circuit coupled to the processor, wherein positioning the magnetoresistive head comprises positioning the magnetoresistive head at an angle relative to a cross-track direction of the patterned cells along at least two tracks formed on the patterned medium, wherein the at least two patterned cells are located within the at least two tracks, and wherein the head partially covers at least one of the at least two patterned cells.

7. The method of claim 6, comprising:
    positioning the head with the drive circuit, wherein positioning the magnetoresistive head comprises positioning the magnetoresistive head over at least one patterned cell in a first track that is shifted in a down-track direction relative to at least one patterned cell in a second track.

8. A method, comprising:
    detecting, with a magnetoresistive head configured to respond to magnetization states of patterned cells formed on a patterned medium, the magnetization state of at least first and second patterned cells formed on a patterned medium at a first sampling time (T1), the at least first and second patterned cells each corresponding to a first and second user data bit pattern;
    generating, with the magnetoresistive head, a first readback signal based on the magnetization state of the at least first and second patterned cells at T1;
    detecting, with the magnetoresistive head, the magnetization state of the at least third and fourth patterned cells formed on the patterned medium at a second sampling time (T2);
    generating, with the magnetoresistive head, a second readback signal based on the magnetization state of the at least third and fourth patterned cells at T2;
    determining, with a detector circuit coupled to the magnetoresistive head, the first user data bit pattern associated the first readback signal; and
    determining, with the detector circuit, the second user data bit pattern associated with the second readback signal with the detector coupled to the magnetoresistive head.

9. The method of claim 8, comprising:
    determining, with a processor circuit coupled to the detector circuit, at least a first position/timing phase contour data corresponding to the first readback signal that is associated with the first user data bit pattern; and
    determining, with the processor circuit, at least a second position/timing phase contour corresponding to the second readback signal that is associated with the second user data bit pattern.

10. The method of claim 9, comprising:
- determining, with the processor circuit, an intersection between the first position/timing phase contour and the second position/timing phase contour; and
- determining, with the processor circuit, the positional information associated with the head based on the intersection of the first and second position/timing phase contours.

11. The method of claim 9, comprising:
- retrieving, from a memory circuit coupled to the processor circuit, the first position/timing phase contour data from a first memory location; and
- retrieving, from the memory circuit coupled to the processor circuit, the second position/timing phase contour data from a second memory location.

12. The method of claim 9, comprising:
- calculating, with the processor circuit, the first position/timing phase contour data based on a surface sensitivity potential distribution of the magnetoresistive head; and
- calculating, with the processor circuit, the second position/timing phase contour data based the surface sensitivity potential distribution of the magnetoresistive head.

13. An apparatus, comprising:
- a magnetoresistive head configured to respond to the magnetization state of at least two patterned cells formed on a patterned medium and to generate a readback signal based on the magnetization state of the at least two patterned cells, the at least two patterned cells corresponding to a user data bit pattern; and
- a detector circuit coupled to the head, the detector configured to determine the user data bit pattern corresponding to the readback signal; and
- a processor circuit coupled to the detector, the processor circuit configured to determine positional information associated with the head relative to the at least two patterned cells based on the user data bit pattern.

14. The apparatus of claim 13, comprising a drive circuit coupled to the processor circuit for positioning the magnetoresistive head at an offset in a cross-track direction relative to the patterned cells across at least two tracks formed on the patterned medium, wherein the at least two patterned cells are located within the at least two tracks, and wherein the head partially covers at least one of the at least two patterned cells.

15. The apparatus of claim 13, comprising a drive circuit coupled to the processor circuit for positioning the magnetoresistive head at an offset in a down-track direction relative to the patterned cells along at least two tracks formed on the patterned medium, wherein the at least two patterned cells are located within the at least two tracks, and wherein the head partially covers at least one of the at least two patterned cells.

16. The apparatus of claim 13, comprising a drive circuit coupled to the processor circuit for positioning the magnetoresistive head at an offset in a down-track direction relative to the patterned cells along at least one track formed on the patterned medium, wherein the at least two patterned cells are located within the at least one tracks, and wherein the head partially covers at least one of the at least two patterned cells.

17. The apparatus of claim 13, comprising a drive circuit coupled to the processor circuit for positioning the magnetoresistive head over at least one patterned cell in a first track that is shifted in a down-track direction relative to at least one patterned cell in a second track.

18. The apparatus of claim 13, comprising a drive circuit coupled to the processor circuit for positioning the magnetoresistive head at an offset at an angle to a cross-track direction relative to the patterned cells along at least two tracks formed on the patterned medium, wherein the at least two patterned cells are located within the at least two tracks, and wherein the head partially covers at least one of the at least two patterned cells.

19. The apparatus of claim 13, wherein:
- the magnetoresistive head is to configured to respond to the magnetization state of at least first and second patterned cells formed on the patterned medium at a first sampling time (T1) and to generate a first readback signal with the magnetoresistive head based on the magnetization state of the at least first and second patterned cells at T1, the at least first and second patterned cells each corresponding to a first and second user data bit pattern;
- the magnetoresistive head is configured to read the magnetization state of the at least third and fourth patterned cells formed on the patterned medium at a second sampling time (T2) and to generate a second readback signal with the magnetoresistive head based on the magnetization state of the at least third and fourth patterned cells at T2; and
- the detector circuit is configured to determine the first user data bit pattern associated the first readback signal and to determine the second user data bit pattern associated with the second readback signal.

20. The apparatus of claim 19, wherein the processor circuit is configured to determine at least a first position/timing phase contour data corresponding to the first user data bit pattern associated with the first readback signal and to determine at least a second position/timing phase contour corresponding to the second user data bit pattern associated with the second readback signal.

21. The apparatus of claim 20, wherein the processor circuit is configured to determine an intersection between the first position/timing phase contour and the second position/timing phase contour and to determine the positional information associated with the magnetoresistive head based on the intersection of the first and second position/timing phase contours.

22. The apparatus of claim 21, comprising a memory circuit coupled to the processor circuit to store the first position/timing phase contour data in a first memory location of the memory circuit and to store the second position/timing phase contour data in a second memory location of the memory circuit.

23. The apparatus of claim 21, wherein the processor circuit is configured to calculate the first and second position/timing phase contour data based on a surface sensitivity potential distribution of the magnetoresistive head.

24. A system, comprising:
- a patterned medium comprising a plurality of patterned cells; and
- a magnetoresistive head configured to magnetically couple to the patterned medium, the magnetoresistive head configured to respond to magnetization states of the patterned cells and to detect a magnetization state of at least two patterned cells formed on the patterned medium and to generate a readback signal based on the magnetization state of the at least two patterned cells), the at least two patterned cells each corresponding to at least two data bit patterns;
- a detector circuit coupled to the magnetoresistive head configured to determine the at least two user data bit patterns based on the readback signal; and
- a processor circuit coupled to the detector circuit configured to determine positional information associated with the magnetoresistive head relative to the at least two patterned cells based on the at least two bit patterns.

25. The system of claim 24, comprising a drive circuit coupled to the processor circuit for positioning the magnetoresistive head relative to the patterned medium.

26. The system of claim 24, wherein:
the magnetoresistive head is to configured to respond to the magnetization state of at least first and second patterned cells formed on the patterned medium at a first sampling time (T1) and to generate a first readback signal with the magnetoresistive head based on the magnetization state of the at least first and second patterned cells at T1, the at least first and second patterned cells each corresponding to a first and second user data bit pattern;
the magnetoresistive head is configured to read the magnetization state of the at least third and fourth patterned cells formed on the patterned medium at a second sampling time (T2) and to generate a second readback signal with the head based on the magnetization state of the at least third and fourth patterned cells at T2; and
the detector circuit is configured to determine the first user data bit pattern associated the first readback signal and to determine the second user data bit pattern associated with the second readback signal.

27. The system of claim 26, wherein the processor circuit is configured to determine at least a first position/timing phase contour data corresponding to the first user data bit pattern associated with the first readback signal and to determine at least a second position/timing phase contour corresponding to the second user data bit pattern associated with the second readback signal.

28. The apparatus of claim 27, wherein the processor circuit is configured to determine an intersection between the first position/timing phase contour and the second position/timing phase contour and to determine the positional information associated with the magnetoresistive head based on the intersection of the first and second position/timing phase contours.

29. The system of claim 28, comprising a memory circuit coupled to the processor circuit to store the first position/timing phase contour data in a first memory location of the memory circuit and to store the second position/timing phase contour data in a second memory location of the memory circuit.

30. The apparatus of claim 28, wherein the processor circuit is configured to calculate the first and second position/timing phase contour data based on a surface sensitivity potential distribution of the magnetoresistive head.

* * * * *